(12) United States Patent
Verfuerth

(10) Patent No.: US 8,445,826 B2
(45) Date of Patent: May 21, 2013

(54) OUTDOOR LIGHTING SYSTEMS AND METHODS FOR WIRELESS NETWORK COMMUNICATIONS

(75) Inventor: Neal R. Verfuerth, Manitowoc, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 0 days.

(21) Appl. No.: 13/223,129

(22) Filed: Aug. 31, 2011

(65) Prior Publication Data

US 2012/0040606 A1     Feb. 16, 2012

Related U.S. Application Data

(63) Continuation-in-part of application No. 12/550,270, filed on Aug. 28, 2009, which is a continuation-in-part of application No. 11/771,317, filed on Jun. 29, 2007, now Pat. No. 7,638,743, and a continuation-in-part of application No. 12/240,805, filed on Sep. 29, 2008, now Pat. No. 8,344,665, which is a continuation-in-part of application No. 12/057,217, filed on Mar. 27, 2008, application No. 13/223,129, which is a continuation-in-part of application No. 12/875,930, filed on Sep. 3, 2010.

(60) Provisional application No. 61/380,121, filed on Sep. 3, 2010, provisional application No. 61/275,985, filed on Sep. 4, 2009.

(51) Int. Cl.
*G01J 1/32*      (2006.01)
*G08G 1/07*      (2006.01)

(52) U.S. Cl.
USPC ......................................... 250/205; 340/910

(58) Field of Classification Search
USPC .................... 250/204, 205; 315/52, 250, 294, 315/312–314, 316, 318, 320, 322, 323, 324, 315/360, 362; 362/11, 13, 16, 18; 340/910, 340/917, 825.52; 348/173; 455/7
See application file for complete search history.

(56) References Cited

U.S. PATENT DOCUMENTS

| | | |
|---|---|---|
| 1,254,520 A | 1/1918 | MacDuff |
| 2,403,240 A | 7/1946 | Sawin |

(Continued)

FOREIGN PATENT DOCUMENTS

| | | |
|---|---|---|
| GB | 2 237 826 | 5/1991 |
| GB | 2 250 172 | 6/1992 |

(Continued)

OTHER PUBLICATIONS

"About Sun Dome Tubular Skylights," having a date indication of © 2009, 8 pages.

(Continued)

*Primary Examiner* — Georgia Y Epps
*Assistant Examiner* — Don Williams
(74) *Attorney, Agent, or Firm* — Foley & Lardner LLP

(57) ABSTRACT

An outdoor lighting fixture includes at least a first ballast for controllably providing power to at least one lamp for illuminating an outdoor area. The outdoor lighting fixture further includes a housing and a radio frequency transceiver. The outdoor lighting fixture yet further includes an antenna coupled to the radio frequency transceiver and extending away from the housing. The outdoor lighting fixture also includes a control circuit that operates the radio frequency transceiver as a wireless router for wireless network communications.

20 Claims, 7 Drawing Sheets

U.S. PATENT DOCUMENTS

| | | |
|---|---|---|
| 2,485,148 A | 10/1949 | Fralin |
| 2,636,977 A | 4/1953 | Foster |
| 3,292,319 A | 12/1966 | McCarthy |
| 3,337,035 A | 8/1967 | Pennybacker |
| 3,416,266 A | 12/1968 | Eron |
| 3,511,559 A | 5/1970 | Foster |
| 4,023,043 A | 5/1977 | Stevenson |
| 4,114,186 A | 9/1978 | Dominguez |
| 4,135,181 A | 1/1979 | Bogacki et al. |
| 4,144,462 A | 3/1979 | Sieron et al. |
| 4,190,800 A | 2/1980 | Kelly et al. |
| 4,204,194 A | 5/1980 | Bogacki |
| 4,204,195 A | 5/1980 | Bogacki |
| 4,306,769 A | 12/1981 | Martinet |
| 4,360,881 A | 11/1982 | Martinson |
| 4,387,417 A | 6/1983 | Plemmons et al. |
| 4,489,386 A | 12/1984 | Breddan |
| 4,727,593 A | 2/1988 | Goldstein |
| 4,733,505 A | 3/1988 | Van Dame |
| 4,809,468 A | 3/1989 | Bareiss |
| 4,841,914 A | 6/1989 | Chattan |
| 4,860,511 A | 8/1989 | Weisner et al. |
| 4,883,340 A | 11/1989 | Dominguez |
| 5,099,622 A | 3/1992 | Sutton |
| 5,253,444 A | 10/1993 | Donoho et al. |
| 5,261,179 A | 11/1993 | Schwinler |
| 5,353,543 A | 10/1994 | Teraoka |
| 5,371,661 A | 12/1994 | Simpson |
| 5,426,620 A | 6/1995 | Budney |
| 5,546,712 A | 8/1996 | Bixby |
| 5,572,438 A | 11/1996 | Ehlers et al. |
| 5,598,042 A | 1/1997 | Mix et al. |
| 5,644,173 A | 7/1997 | Elliason et al. |
| 5,649,394 A | 7/1997 | Ohba |
| 5,655,339 A | 8/1997 | DeBlock et al. |
| 5,713,160 A | 2/1998 | Heron |
| 5,717,609 A | 2/1998 | Packa et al. |
| 5,729,387 A | 3/1998 | Takahashi et al. |
| 5,758,331 A | 5/1998 | Johnson |
| 5,836,114 A | 11/1998 | Ohba |
| 5,918,404 A | 7/1999 | Ohba |
| 5,956,462 A | 9/1999 | Langford |
| 5,962,989 A | 10/1999 | Baker |
| 6,003,471 A | 12/1999 | Ohba |
| 6,122,603 A | 9/2000 | Budike, Jr. |
| 6,169,979 B1 | 1/2001 | Johnson |
| 6,257,735 B1 | 7/2001 | Baar |
| D447,266 S | 8/2001 | Verfuerth |
| 6,363,667 B2 | 4/2002 | O'Neill |
| 6,367,419 B1 | 4/2002 | Gosselin |
| 6,418,674 B1 | 7/2002 | Deraedt |
| D463,059 S | 9/2002 | Verfuerth |
| 6,467,933 B2 | 10/2002 | Baar |
| 6,528,957 B1 | 3/2003 | Luchaco |
| 6,535,859 B1 | 3/2003 | Yablonowski et al. |
| 6,585,396 B1 | 7/2003 | Verfuerth |
| D479,826 S | 9/2003 | Verfuerth et al. |
| 6,622,097 B2 | 9/2003 | Hunter |
| 6,633,823 B2 | 10/2003 | Bartone et al. |
| 6,644,836 B1 | 11/2003 | Adams |
| D483,332 S | 12/2003 | Verfuerth |
| 6,671,586 B2 | 12/2003 | Davis et al. |
| 6,717,660 B1 | 4/2004 | Bernardo |
| 6,731,080 B2 | 5/2004 | Flory |
| D494,700 S | 8/2004 | Hartman et al. |
| 6,785,592 B1 | 8/2004 | Smith et al. |
| 6,813,864 B2 | 11/2004 | Landis |
| 6,828,695 B1 | 12/2004 | Hansen |
| 6,832,135 B2 | 12/2004 | Ying |
| 6,894,609 B2 | 5/2005 | Menard et al. |
| 6,938,210 B1 | 8/2005 | Huh |
| 6,979,097 B2 | 12/2005 | Elam et al. |
| 6,983,210 B2 | 1/2006 | Matsubayashi et al. |
| 6,990,394 B2 | 1/2006 | Pasternak |
| 7,027,736 B1 | 4/2006 | Mier-Langner et al. |
| 7,130,719 B2 | 10/2006 | Ehlers et al. |
| 7,130,832 B2 | 10/2006 | Bannai et al. |
| 7,167,777 B2 | 1/2007 | Budike, Jr. |
| 7,264,177 B2 | 9/2007 | Buck et al. |
| D557,817 S | 12/2007 | Verfuerth et al. |
| 7,307,542 B1 | 12/2007 | Chandler et al. |
| D560,469 S | 1/2008 | Bartol et al. |
| 7,369,056 B2 | 5/2008 | McCollough, Jr. |
| 7,401,942 B1 | 7/2008 | Verfuerth et al. |
| 7,518,531 B2 | 4/2009 | Butzer et al. |
| D595,894 S | 7/2009 | Verfuerth et al. |
| 7,563,006 B1 | 7/2009 | Verfuerth et al. |
| 7,575,338 B1 | 8/2009 | Verfuerth |
| D606,697 S | 12/2009 | Verfuerth et al. |
| 7,628,506 B2 | 12/2009 | Verfuerth et al. |
| 7,638,743 B2 | 12/2009 | Bartol et al. |
| D617,028 S | 6/2010 | Verfuerth et al. |
| D617,029 S | 6/2010 | Verfuerth et al. |
| 7,738,999 B2 | 6/2010 | Petite |
| 7,746,003 B2 | 6/2010 | Verfuerth et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,780,310 B2 | 8/2010 | Verfuerth et al. |
| 7,784,966 B2 | 8/2010 | Verfuerth et al. |
| D623,340 S | 9/2010 | Verfuerth et al. |
| 7,847,706 B1 * | 12/2010 | Ross et al. ................ 340/12.52 |
| 7,859,398 B2 | 12/2010 | Davidson et al. |
| D632,006 S | 2/2011 | Verfuerth et al. |
| 8,033,686 B2 | 10/2011 | Recker et al. |
| D650,225 S | 12/2011 | Bartol et al. |
| 8,070,312 B2 | 12/2011 | Verfuerth et al. |
| 8,138,690 B2 | 3/2012 | Chemel et al. |
| 8,255,090 B2 | 8/2012 | Frader-Thompson et al. |
| 2001/0055965 A1 | 12/2001 | Delp et al. |
| 2002/0065583 A1 | 5/2002 | Okada et al. |
| 2002/0082748 A1 | 6/2002 | Enga et al. |
| 2002/0103655 A1 | 8/2002 | Boies et al. |
| 2002/0162032 A1 | 10/2002 | Gundersen et al. |
| 2002/0172049 A1 | 11/2002 | Yueh |
| 2003/0011486 A1 | 1/2003 | Ying |
| 2003/0016143 A1 | 1/2003 | Ghazarian |
| 2003/0036820 A1 | 2/2003 | Yellepeddy et al. |
| 2003/0041017 A1 | 2/2003 | Spool et al. |
| 2003/0041038 A1 | 2/2003 | Spool et al. |
| 2003/0046252 A1 | 3/2003 | Spool et al. |
| 2003/0084358 A1 | 5/2003 | Bresniker et al. |
| 2003/0084359 A1 | 5/2003 | Bresniker et al. |
| 2003/0093332 A1 | 5/2003 | Spool et al. |
| 2003/0171851 A1 | 9/2003 | Brickfield et al. |
| 2003/0179577 A1 | 9/2003 | Marsh |
| 2004/0006439 A1 | 1/2004 | Hunter |
| 2004/0024483 A1 | 2/2004 | Holcombe |
| 2004/0076001 A1 | 4/2004 | Lutes |
| 2004/0078153 A1 | 4/2004 | Bartone et al. |
| 2004/0078154 A1 | 4/2004 | Hunter |
| 2004/0083163 A1 | 4/2004 | Cooper |
| 2004/0095237 A1 | 5/2004 | Chen et al. |
| 2004/0128266 A1 | 7/2004 | Yellepeddy et al. |
| 2004/0193329 A1 | 9/2004 | Ransom et al. |
| 2005/0027636 A1 | 2/2005 | Gilbert et al. |
| 2005/0034023 A1 | 2/2005 | Maturana et al. |
| 2005/0035717 A1 | 2/2005 | Adamson et al. |
| 2005/0038571 A1 | 2/2005 | Brickfield et al. |
| 2005/0043860 A1 | 2/2005 | Petite |
| 2005/0124346 A1 | 6/2005 | Corbett et al. |
| 2005/0232289 A1 | 10/2005 | Walko et al. |
| 2006/0044152 A1 | 3/2006 | Wang |
| 2006/0065750 A1 | 3/2006 | Fairless |
| 2006/0085301 A1 | 4/2006 | Leahy |
| 2006/0125426 A1 | 6/2006 | Veskovic et al. |
| 2006/0253885 A1 | 11/2006 | Murphy et al. |
| 2007/0043478 A1 | 2/2007 | Ehlers et al. |
| 2007/0085701 A1 | 4/2007 | Walters et al. |
| 2007/0097993 A1 | 5/2007 | Bojahra et al. |
| 2007/0145915 A1 | 6/2007 | Roberge et al. |
| 2007/0222581 A1 | 9/2007 | Hawkins et al. |
| 2008/0143273 A1 * | 6/2008 | Davidson et al. ............ 315/294 |
| 2008/0147465 A1 | 6/2008 | Raines et al. |
| 2008/0183337 A1 | 7/2008 | Szabados |
| 2008/0218317 A1 | 9/2008 | Choi |
| 2008/0266664 A1 | 10/2008 | Winston et al. |

| | | | |
|---|---|---|---|
| 2008/0275802 | A1 | 11/2008 | Verfuerth et al. |
| 2009/0000217 | A1 | 1/2009 | Verfuerth et al. |
| 2009/0147507 | A1 | 6/2009 | Verfuerth et al. |
| 2009/0150004 | A1 | 6/2009 | Wang et al. |
| 2009/0222142 | A1 | 9/2009 | Kao et al. |
| 2009/0243517 | A1 | 10/2009 | Verfuerth et al. |
| 2009/0248217 | A1 | 10/2009 | Verfuerth et al. |
| 2009/0251066 | A1 | 10/2009 | Baaijens et al. |
| 2009/0299811 | A1 | 12/2009 | Verfuerth et al. |
| 2009/0315485 | A1 | 12/2009 | Verfuerth et al. |
| 2010/0061088 | A1 | 3/2010 | Bartol et al. |
| 2010/0246168 | A1 | 9/2010 | Verfuerth et al. |
| 2011/0060701 | A1 | 3/2011 | Verfuerth et al. |
| 2011/0146669 | A1 | 6/2011 | Bartol et al. |
| 2011/0235317 | A1 | 9/2011 | Verfuerth et al. |
| 2011/0279063 | A1 | 11/2011 | Wang et al. |
| 2012/0037725 | A1 | 2/2012 | Verfuerth |
| 2012/0038281 | A1 | 2/2012 | Verfuerth |
| 2012/0038490 | A1 | 2/2012 | Verfuerth |
| 2012/0044350 | A1 | 2/2012 | Verfuerth |
| 2012/0081906 | A1 | 4/2012 | Verfuerth et al. |
| 2012/0167957 | A1 | 7/2012 | Verfuerth et al. |
| 2012/0274222 | A1 | 11/2012 | Verfuerth et al. |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

U.S. Appl. No. 13/249,001, filed Sep. 29, 2011, Verfuerth et al.
U.S. Appl. No. 13/275,536, filed Oct. 18, 2011, Verfuerth et al.
U.S. Appl. No. 13/296,058, filed Nov. 14, 2011, Verfuerth et al.
U.S. Appl. No. 13/333,293, filed Dec. 21, 2011, Verfuerth et al.
U.S. Appl. No. 61/466,411, filed Mar. 22, 2011, Verfuerth et al.
Deru et al.; BigHorn Home Improvement Center Energy Performance; ASHRAE Transactions, Atlanta: 2006 vol. 112, 26 pages.
Halliday, D., et al., Physics Part I and II; John Wiley & Sons, Inc. 1967 (9 pgs.).
Harris, L. R., et al., "Pacific Northwest Laboratory's Lighting Technology Screening Matrix," PNL-SA-23871, Apr. 1994, U.S. Department of Energy, Pacific Northwest Laboratory, Richland, SA-23871, Washington 99352, pp. 1-14.
Notice of Acceptance (NOA) from Miami-Dade County, Building Code Compliance Office, Product Control Division, Approval Date Dec. 13, 2007, 2 pages.
Sun-Dome /Tubular Skylight, Daylighting Technologies, Riviera Beach, FL, revision Oct. 22, 2007, 1 page.
Galasiu et al. "Energy saving lighting control systems for open-plan offices: a filed study"; Jul. 2007, National Research Council Canada; vol. 4; No. 1, pp. 1-28, 56 pages.

* cited by examiner

US 8,445,826 B2

OUTDOOR LIGHTING SYSTEMS AND METHODS FOR WIRELESS NETWORK COMMUNICATIONS

CROSS-REFERENCE TO RELATED PATENT APPLICATIONS

This application claims the benefit of priority under 35 U.S.C. §119(e) of U.S. Provisional Application No. 61/380,121, filed on Sep. 3, 2010, and titled "Outdoor Lighting Systems and Methods for Wireless Network Communications." This Application also claims the benefit of priority as a Continuation-In-Part of U.S. application Ser. No. 12/875,930, filed on Sep. 3, 2010, which claims the benefit of priority of U.S. Application No. 61/275,985, filed on Sep. 4, 2009. This Application also claims the benefit of priority as a Continuation-In-Part of U.S. application Ser. No. 12/550,270, filed on Aug. 28, 2009, which is a Continuation-In-Part of application Ser. No. 11/771,317, filed Jun. 29, 2007, and is also a Continuation-In-Part of U.S. Ser. No. 12/240,805, filed on Sep. 29, 2008, which is a Continuation-In-Part of U.S. application Ser. No. 12/057,217, filed Mar. 27, 2008. The subject matter of application Ser. Nos. 61/380,128, 61/275,985, 12/875,930, 12/550,270, 12/240,805, 12/057,217, and 11/771,317 are hereby incorporated herein by reference in their entirety.

BACKGROUND

The present invention relates generally to the field of outdoor lighting systems and methods. The present invention also relates to the field of wireless network communications.

It is challenging and difficult to provide robust wireless communications networks such as WiFi networks over a wide area. A conventional approach to implementing such systems have included increasing the transmitting power of the systems. Such an approach, however, can result in undesirable interference with other radio frequency devices near the transmitter and still result in coverage gaps at the periphery of each transmitter's range. Further, the amount of power needed for substantially increasing antenna transmitting range can be large. Accordingly, improved systems and methods for providing distributed wireless network communications are needed.

SUMMARY

One embodiment of the invention relates to an outdoor lighting fixture that includes at least a first ballast for controllably providing power to at least one lamp for illuminating an outdoor area. The outdoor lighting fixture further includes a housing and a radio frequency transceiver. The outdoor lighting fixture yet further includes an antenna coupled to the radio frequency transceiver and extending away from the housing. The outdoor lighting fixture also includes a control circuit that operates the radio frequency transceiver as a wireless router for wireless network communications.

Another embodiment of the invention relates to a system of outdoor lighting fixtures. The system includes a first outdoor lighting fixture comprising a first housing and a first radio frequency transceiver mounted to the first housing. The system also includes a second outdoor lighting fixture comprising a second housing and a second radio frequency transceiver mounted to the second housing. The first outdoor lighting fixture further includes wireless routing circuitry and a wired uplink connection to a data communications network. The second radio frequency transceiver is configured to extend the range of the first radio frequency transceiver by forwarding data communications to and from the first radio frequency transceiver.

Another embodiment of the invention relates to a method for providing municipal wireless network connectivity. The method includes coupling a plurality of outdoor lighting fixtures to existing street light poles. The method further includes powering the plurality of outdoor lighting fixtures using power wires from the existing street light poles and establishing a wireless network of outdoor lighting fixtures by configuring radio frequency transceivers of the plurality of outdoor lighting fixtures to serve as wireless network access points.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Referring generally to the Figures, systems and methods for providing wireless network communications are shown and described. The systems and methods utilize a plurality of outdoor lighting fixtures having radio frequency transceivers to create the wireless network. The outdoor lighting fixtures and their radio frequency transceivers can be used to create a network of wireless access points or "hotspots" to create a community-wide wireless communications network (e.g., a community-wide WiFi network). In an exemplary embodiment of the invention, an outdoor lighting fixture includes a ballast for controllably providing power to one or more lamps for illuminating an outdoor area. The outdoor lighting fixture further includes a housing and a radio frequency transceiver, and an antenna extending away from the housing and coupled to the radio frequency transceiver. A control circuit operates the radio frequency transceiver as a wireless router for wireless network communications. In some embodiments the lighting fixtures may be streetlights. Streetlights that provide wireless access point or "hotspot" circuitry may be relatively symmetrically spaced to provide for wide coverage of a WiFi network. The network may use wireless meshed networking to provide for a robust (e.g., self-healing) community network.

Figure 1:
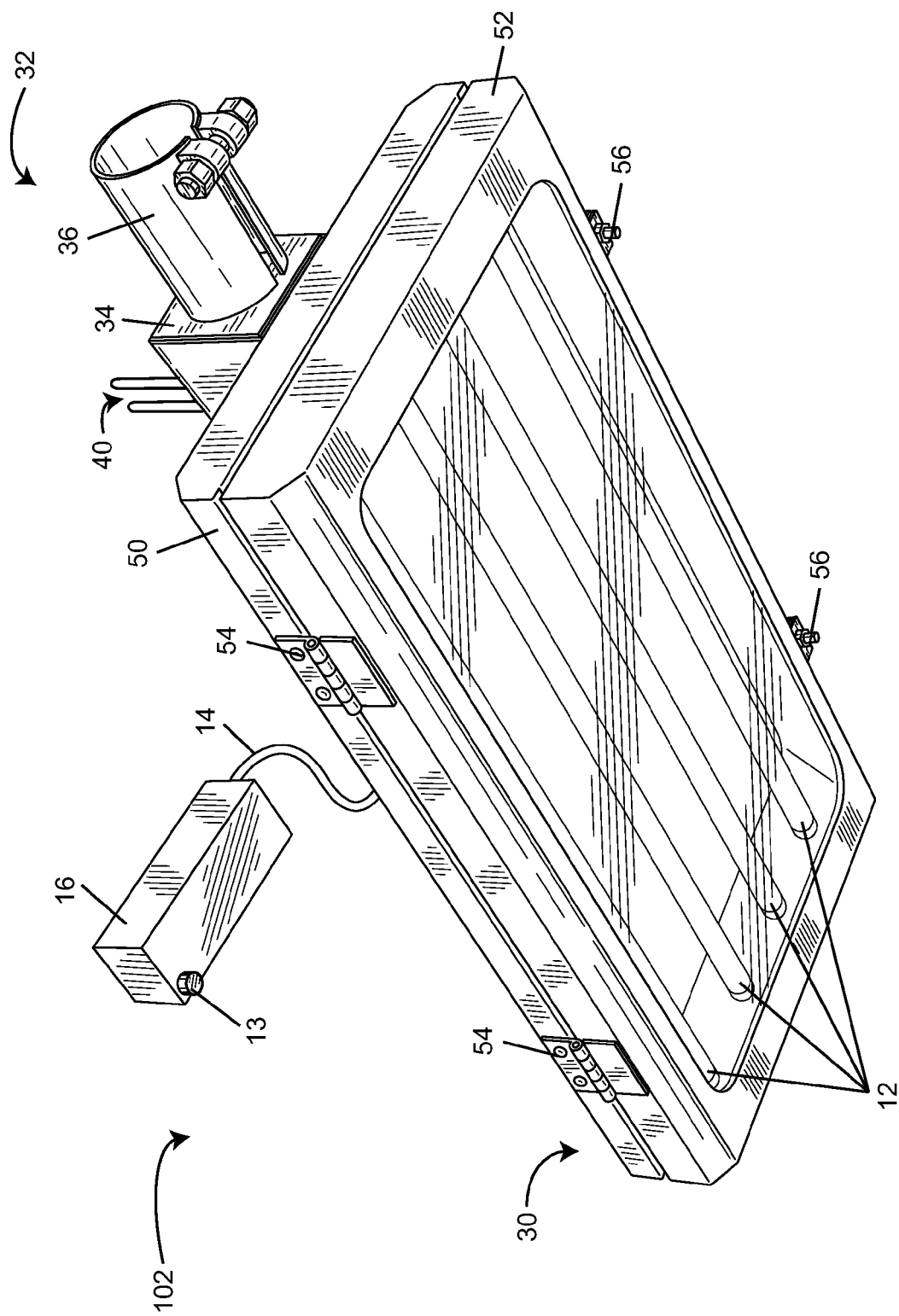
FIG. 1 is a bottom perspective view of an outdoor fluorescent lighting fixture, according to an exemplary embodiment.

Referring now to FIG. 1, a bottom perspective view of an outdoor fluorescent lighting fixture 102 is shown, according to an exemplary embodiment. The outdoor fluorescent lighting fixture 102 is configured for an application such as a street lighting application or parking lot lighting application. In some embodiments, outdoor fluorescent lighting fixture 102 is configured to include a mounting system 32 for coupling the fluorescent lighting fixture to high poles or masts (e.g., high poles for holding street lights, high poles for holding parking lot lights, etc). Outdoor fluorescent lighting fixture 102 is configured to provide wireless communications capabilities. The outdoor fluorescent lighting fixture 102 may also include one or more lighting control circuits implementing lighting control algorithms (e.g., based on sensor feedback, based on received wireless commands or wireless messages, etc.), built-in redundancy, and venting. Many of the outdoor lighting fixtures described herein may advantageously mount to existing street light poles or other outdoor structures for holding lighting fixtures such that no modification to the existing infrastructure (other than replacing the lighting fixture itself) is necessary. In some embodiments, the outdoor lighting fixtures include control circuits for providing energy saving control features to a group of lighting fixtures or a municipality without changing existing power wiring run from pole to pole. While many of the embodiments described herein are of a fluorescent lighting fixture, in other embodiments the lighting fixture may be configured for illuminating an area using other lamp technologies (e.g., high intensity discharge (HID), high intensity fluorescent (HIF), light emitting diode (LED), etc.).

Referring still to FIG. 1, antennas 40 are coupled to radio frequency transceiver circuitry contained in outdoor lighting fixture 102. In alternative embodiments antennas 40 are located on controller 16 and controller 16 is held above, below, or laterally relative to outdoor lighting fixture 102 on the pole or mast to which outdoor lighting fixture 102 is coupled. In the embodiment shown in FIG. 1, antennas 40 are coupled to the top of mounting system 34 and the radio frequency transceiver for antennas 40 is housed within one of mounting system 34, the housing 30 for outdoor lighting fixture 102, and the housing of controller 16. While multiple antennas for the radio frequency transceiver may be provided to outdoor lighting fixture 102 as shown in FIG. 1, in other embodiments only a single antenna is coupled to outdoor lighting fixture 102's radio frequency transceiver. According to various embodiments, antennas 40 can be configured to support a multiple-input and multiple-out (MIMO) antenna configuration, a single-input and multiple-output antenna configuration (SIMO), a multiple-input and single-output antenna configuration (MISO), a single-input and single-output antenna configuration (SISO), or otherwise. According to an exemplary embodiment antennas 40 are configured (e.g., tuned) to provide 2.4 ghz WiFi communications capabilities. In other exemplary embodiments antennas 40 are configured (e.g., tuned, controlled to, etc.) provide 5.8 ghz WiFi communications capabilities. In yet other exemplary embodiments other wireless networking protocols, communications capabilities, standards, or proprietary communications schemes may be implemented in the outdoor lighting fixture 102 and by antennas 40. Antennas 40 will be shaped, sized, and located appropriately relative to outdoor lighting fixture 102 based on the protocols, communications schemes, and other radio frequency design considerations. In an exemplary embodiment antennas 40 are used by a radio frequency transceiver located with lighting fixture 102, inside housing 30, or otherwise located to provide a wireless networking access point or "hotspot." Accordingly, once the radio frequency transceiver and antennas 40 of lighting fixture 102 are active, users may use laptops, desktops, or portable electronic devices having radio frequency transceivers to wirelessly communicate with the radio frequency transceiver and antennas 40 of lighting fixture 102. Using an uplink connection of the radio frequency transceiver (e.g., provided by a wired high speed networking line, provided via a wireless hop to another device or network, etc.) outdoor lighting fixture 102 can use antennas 40 and the associated radio frequency transceiver to serve as a router, bridge, or wireless access point to, for example, the Internet, a WAN, or a service provider.

In FIG. 1, outdoor lighting fixture 102 is configured for coupling to a pole and for directing light toward the ground. Such an orientation may be used to illuminate streets, sidewalks, bridges, parking lots, and other outdoor areas where ground illumination is desirable. Outdoor lighting fixture 102 is shown to include a mounting system 32 and a housing 30. Mounting system 32 is configured to mount fixture 102 including housing 30 to a pole or mast. In an exemplary embodiment, housing 30 surrounds one or more fluorescent lamps 12 (e.g., fluorescent tubes) and includes a lens (e.g., a plastic sheet, a glass sheet, etc.) that allows light from the one or more fluorescent lamps to be provided from housing 30.

Mounting system 32 is shown to include a mount 34 and a compression sleeve 36. Compression sleeve 36 is configured to receive the pole and to tighten around the pole (e.g., when a clamp is closed, when a bolt is tightened, etc.). Compression sleeve 36 may be sized and shaped for attachment to existing outdoor poles such as street light poles, sidewalk poles, parking lot poles, and the like. As is provided by mounting system 32, the coupling mechanism may be mechanically adaptable to different poles or masts. For example, compression sleeve 36 may include a taper or a tapered cut so that compression sleeve 36 need not match the exact diameter of the pole or mast to which it will be coupled. While lighting fixture 102 shown in FIG. 1 utilizes a compression sleeve 36 for the mechanism for coupling mounting system 32 to a pole or mast, other coupling mechanisms may alternatively be used (e.g., a two-piece clamp, one or more arms that bolt to the pole, etc.).

According to an exemplary embodiment, fixture 102 and housing 30 are elongated and mount 34 extends along the length of housing 30. Mount 34 is preferably secured to housing 30 in at least one location beyond a lengthwise center point and at least one location before the lengthwise center point. In other exemplary embodiments, the axis of compression sleeve 36 also extends along the length of housing 30. In the embodiment shown in FIG. 1, compression sleeve 36 is coupled to one end of mount 34 near a lengthwise end of housing 30.

Housing 30 is shown to include a fixture pan 50 and a door frame 52 that mates with fixture pan 50. In the embodiments shown in the Figures, door frame 52 is mounted to fixture pan 50 via hinges 54 and latches 56. When latches 56 are released, door frame 52 swings away from fixture pan 50 to allow access to fluorescent bulbs 12 within housing 30. Latches 56 are shown as compression-type latches, although many alternative locking or latching mechanisms may be alternatively or additionally provided to secure the different sections of the housing. In some embodiments latches 56 may be similar to those found on "NEMA 4" type junction boxes or other closures. Further, many different hinge mechanisms may be used. Yet further, in some embodiments door frame 52 and fixture pan 50 may not be joined by a hinge and may be secured together via latches 56 on all sides, any number of screws, bolts or other fasteners that do not allow hinging, or the like. In an exemplary embodiment, fixture pan 50 and door frame 52 are configured to sandwich a rubber gasket that provides some sealing of the interior of housing 30 from the outside environment. In some embodiments the entirety of the interior of the lighting fixture is sealed such that rain and other environmental moisture does not easily enter housing 30. Housing 30 and its component pieces may be galvanized steel but may be any other metal (e.g., aluminum), plastic, and/or composite material. Housing 30, mounting system 32 and/or the other metal structures of lighting fixture 102 may be powder coated or otherwise treated for durability of the metal. According to an exemplary embodiment housing 30 is powder coated on the interior and exterior surfaces to provide a hard, relatively abrasion resistant, and tough surface finish.

Housing 30, mounting system 32, compression sleeve 36, and the entirety of lighting fixture 102 are preferably extremely robust and able to withstand environmental abuses of outdoor lighting fixtures. The shape of housing 30 and mounting system 32 are preferably such that the effective projection area (EPA) relative to strong horizontal winds is minimized—which correspondingly provides for minimized wind loading parameters of the lighting fixture.

Ballasts, structures for holding lamps, and the lamps themselves may be installed to the interior of fixture pan 50. Further, a reflector may be installed between the lamp and the interior metal of fixture pan 50. The reflector may be of a defined geometry and coated with a white reflective thermosetting powder coating applied to the light reflecting side of the body (i.e., a side of the reflector body that faces toward a fluorescent light bulb). The white reflective coating may have reflective properties, which in combination with the defined geometry of the reflector, provides high reflectivity. The reflective coating may be as described in U.S. Prov. Pat. App. No. 61/165,397, filed Mar. 31, 2009. In other exemplary embodiments, different reflector geometries may be used and the reflector may be uncoated or coated with other coating materials. In yet other embodiments, the reflector may be a "MIRO 4" type reflector manufactured and sold by Alanod GmbH & Co KG.

The shape and orientation of housing 30 relative to the reflector and/or the lamps is configured to provide a full cut off such that light does not project above the plane of fixture pan 50. The lighting fixtures described herein are preferably "dark-sky" compliant or friendly.

To provide further resistance to environmental variables such as moisture, housing 30 may include one or more vents configured to allow moisture and air to escape housing 30 while not allowing moisture to enter housing 30. Moisture may enter enclosed lighting fixtures due to vacuums that can form during hot/cold cycling of the lamps. According to an exemplary embodiment, the vents include, are covered by, or are in front of one or more pieces of material that provide oleophobic and hydrophobic protection from water, washing products, dirt, dust and other air contaminants. According to an exemplary embodiment the vents may include GORE membrane sold and manufactured by W.L. Gore & Associates, Inc. The vent may include a hole in the body of housing 30 that is plugged with a snap-fit (or otherwise fit) plug including an expanded polytetrafluoroethylene (ePTFE) membrane with a polyester non-woven backing material.

Controller 16 is connected to lighting fixture 102 via wire 14. Controller 16 is configured to control the switching between different states of lighting fixture 102 (e.g., all lamps on, all lamps off, some lamps on, etc.). Controller 16 may be configured to provide control of the wireless features for lighting fixture 102. For example, controller 16 can house or otherwise include the radio frequency transceiver and accompanying electronics for providing wireless access point features described herein. In such an embodiment, antennas 40 may be coupled to controller 16 rather than mounting system 32.

According to various embodiments, controller 16 is further configured to log usage information for lighting fixture 102 in a memory device local to controller 16. Controller 16 may further be configured to use the logged usage information to affect control logic of controller 16. Controller 16 may also or alternatively be configured to provide the logged usage information to another device for processing, storage, or display. Controller 16 is shown to include a sensor 13 coupled to controller 16 (e.g., controller 16's exterior housing). Controller 16 may be configured to use signals received from sensor 13 to affect control logic of controller 16. Further, controller 16 may be configured to provide information relating to sensor 13 to another device.

While various Figures of the present disclosure, including FIG. 1, illustrate lighting fixtures for fluorescent lamps, it should be noted that embodiments of the present disclosure may be utilized with any type of lighting fixture and/or lamps (e.g., HID, LED, etc.). Further, while housing 30 is shown as being fully enclosed (e.g., having a door and window covering the underside of the fixture), it should be noted that any variety of lighting fixture shapes, styles, or types may be utilized with embodiments of the present disclosure. Further, while controller 16 is shown as having a housing that is exterior to housing 30 of lighting fixture 102, it should be appreciated that controller 16 may be physically integrated with housing 30. For example, one or more circuit boards or circuit elements of controller 16 may be housed within, on top of, or otherwise secured to housing 30. Further, in other exemplary embodiments, controller 16 (including its housing) may be coupled directly to housing 30. For example, controller 16's housing may be latched, bolted, clipped, or otherwise coupled to the interior or exterior of housing 30. Controller 16's housing may generally be shaped as a rectangle (as shown), may include one or more non-right angles or curves, or otherwise configured. In an exemplary embodiment, controller 16's housing is made of plastic and housing 30 for the lighting fixture 102 is made from metal. In other embodiments, other suitable materials may be used.

Figure 2:
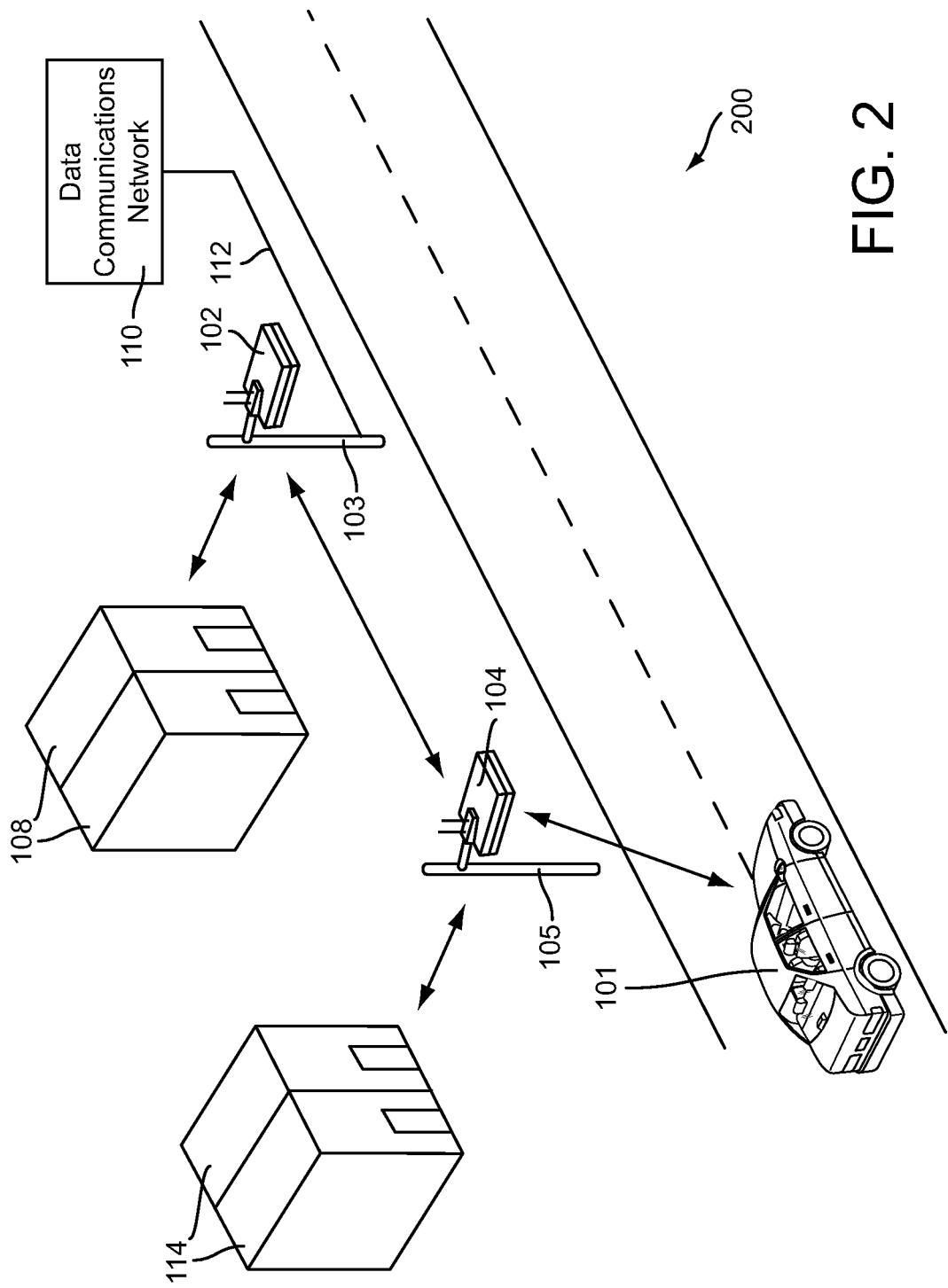
FIG. 2 is a system of outdoor lighting fixtures for providing wireless network connectivity, according to an exemplary embodiment.

Referring now to FIG. 2, a system 200 of outdoor lighting fixtures for providing wireless network connectivity is shown, according to an exemplary embodiment. System 200 is shown to include a plurality of outdoor lighting fixtures 102, 104 that are coupled to street light poles 103, 105 (e.g., conventional street light poles, existing street light poles, etc.). Outdoor lighting fixtures 102, 104 may be as described with reference to FIG. 1 or otherwise. Outdoor lighting fixtures 102, 104 may be powered using power wires from the existing street light poles 103, 105. A wireless network may be formed using outdoor lighting fixtures 102, 104 by configuring radio frequency transceivers of the plurality of outdoor lighting fixtures 102, 104 to serve as wireless network access points.

Referring further to the illustration of FIG. 2, a first outdoor lighting fixture 102 is shown as coupled via a wired link 112 to a data communications network 110. First outdoor lighting fixture 102 includes a radio frequency transceiver, wireless routing circuitry, and a wired uplink connection for communicating via wired link 112 to data communications network 110. The radio frequency transceiver and wireless routing circuitry of outdoor lighting fixture 102 may be configured to serve as a network access point or "hotspot" for remote devices within range of outdoor lighting fixture 102's transmission and reception range. For example, as shown in FIG. 2, residences 108 within the transmission and reception range of outdoor lighting fixture 102 can connect to the data communications network 110 (e.g., the Internet, an Internet service provider, a private WAN, a public WAN, etc.) via a wireless access point provided by lighting fixture 102.

Residences 114 are outside of outdoor lighting fixture 102's transmission and reception range. In the illustration of FIG. 2, however, a second outdoor lighting fixture 104 includes a radio frequency transceiver that is configured to extend the range of the first radio frequency transceiver of fixture 102 by forwarding data communications to and from the first radio frequency transceiver. So, for example, a user with a laptop computer may connect to the uplink provided by outdoor lighting fixture 102 by communicating directly outdoor lighting fixture 104. In some embodiments outdoor lighting fixture 104's radio frequency transceiver may include reduced function circuitry configured to extend the range of the radio frequency transceiver of outdoor lighting fixture 102. In other embodiments outdoor lighting fixture 104 includes a radio frequency transceiver including full function wireless routing circuitry and can stand-alone as a wireless access point or "hotspot" as long as some sort of uplink connection (e.g., wireless via outdoor lighting fixture 102, wired, satellite, etc.) is available. Regardless of whether outdoor lighting fixture 104 includes full-function wireless access point circuitry or reduced function wireless extender circuitry, devices within residences 114 are able to communicate with the data communications network 110 by communicating with the radio frequency transceiver of outdoor lighting fixture 104. Transmissions from devices within residences 114 are received by outdoor lighting fixture 104's radio frequency transceiver and forwarded to outdoor lighting fixture 102 for transmission to data communications network 110. Messages from data communications network 110 for residences 114 are received at outdoor lighting fixture 102's uplink and wirelessly transmitted to outdoor lighting fixture 104 from the radio frequency transceiver of outdoor lighting fixture 102. Outdoor lighting fixture 104 receives the messages and routes or retransmits the messages on to devices within residences 114. Similarly, vehicles 101 that are near outdoor lighting fixtures 102, 104 that together or separately form wireless hotspots are able to communicate with data communications network 110 via the provided wireless hotspot(s).

In an exemplary embodiment outdoor lighting fixture 104 includes a radio frequency transceiver configured to obtain uplink data from a plurality of other lighting fixtures. For example, the radio frequency transceiver of outdoor lighting fixture 104 can be configured to select between two possible "uplink" connections to achieve the most reliable networking and to provide the most reliable wireless access point experience to end users. For example, if outdoor lighting fixture 102 includes a first quality of service parameter (e.g., signal to noise, signal strength, etc.) and another lighting fixture not shown in FIG. 2 provides a better quality of service parameter to outdoor lighting fixture 104, the control circuit of outdoor lighting fixture 104 can switch from using outdoor lighting fixture 102 for an uplink to using the other lighting fixtures. The control circuit of outdoor lighting fixture 104 can re-check the quality of service parameters from all nearby wireless uplinks on a random basis, a timed basis, a conditional basis (e.g., when quality from the previously preferred uplink source drops below a threshold), or can be triggered by a user or service professional. Accordingly, the network formed from outdoor lighting fixtures 102, 104 can automatically configure, organize, or "heal" based on real and/or variable RF conditions. Further, the wireless controller of each outdoor lighting fixture can include circuitry for implementing a wireless meshed networking topology. Using a wireless meshed networking topology, each outdoor lighting fixture of the network may determine the next best "hop" back to a data communications network uplink or to a downlink destination. To implement such a topology, each outdoor lighting fixture 102, 104 can include a dynamic routing table that relates outdoor lighting fixtures to next nodes in the system for reaching certain other nodes.

Figure 3A:
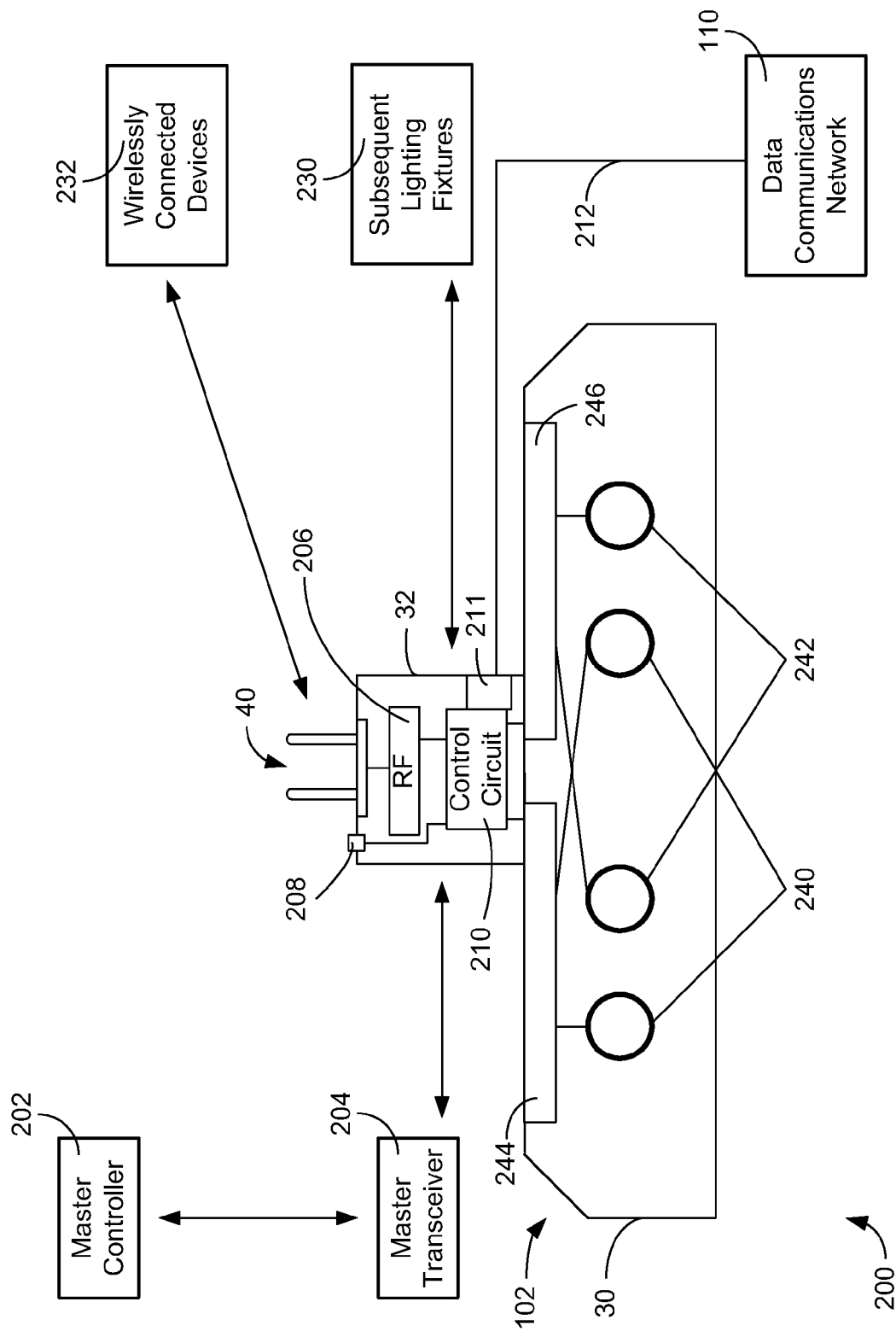
FIG. 3A is a diagram of a portion of the system of FIG. 2, according to an exemplary embodiment.

FIG. 3A is a diagram of a portion of the system 200 illustrated in FIG. 2, according to an exemplary embodiment. System 200 is shown to include an outdoor lighting fixture 102 including housing 30 and a mounting system 32 which may be the same as or different than those previously shown and described in the disclosure. Electronics for lighting fixture 102 are shown inside mounting system 32. The electronics may be user-accessible via an opening in the top of mounting system 32. The diagram shown in FIG. 3A illustrates two lamp sets 240, 242 with two fluorescent lamps forming each lamp set 240, 242. Each lamp set 240, 242 may include one or any number of additional fluorescent lamps. Further, while some embodiments described herein relate to providing redundant lamp sets and ballasts, it should be appreciated that many embodiments of the present disclosure may only include a single lamp set and a single ballast. In other embodiments more than two ballasts and lamp sets may be included in a single lighting fixture. While the fluorescent lamps are illustrated as tube lamps extending lengthwise relative to the lighting fixture, the fluorescent lamps may be compact fluorescent bulbs, run perpendicular to the length of the lighting fixture, or be otherwise oriented.

Referring still to FIG. 3A, the fixture mounting system 32 is shown to include (e.g., house) a control circuit 210 and a radio frequency transceiver 206 communicably connected to control circuit 210. In other embodiments the control circuit 210 and radio frequency transceiver 206 may be housed in different structures and separately located. Control circuit 210 is coupled to ballasts 244, 246 and is configured to provide control signals to ballasts 244, 246. Control circuit 210 may be coupled to a relay or relays so that control circuit 210 controllably switches the relay from providing power to ballasts 244, 246 or from restricting power to ballasts 244, 246. According to an exemplary embodiment, the system shown in FIG. 3A is configured to receive lighting control signals from a master controller 202 or a master transceiver 204 via radio frequency transceiver 206. The system shown in FIG. 3A is also configured to serve as a wireless access point to another network for one or more remote devices using radio frequency transceiver 206 (e.g., other lighting fixtures 230, connected devices 232, etc.). Accordingly, radio frequency transceiver 206 is both configured to receive/transmit lighting control signals (e.g., "on" commands, "off" commands, "dim" commands, etc.) and to receive/transmit wireless access point or "hotspot" data (e.g., Internet data communications, WAN data communications, etc.).

In an exemplary embodiment radio frequency transceiver 206 is a WiFi transceiver and is configured to serve as a wireless access point for a plurality of wirelessly connected devices (e.g., laptops, personal computers, WiFi-enabled mobile phones, WiFi-enabled vehicles, etc.). Outdoor lighting fixture 102 is further shown to include a wired uplink interface 211. Wired uplink interface 211 may be or include a wire terminal, hardware for interpreting analog or digital signals received at the wire terminal, or one or more jacks, connectors, plugs, filters, or other hardware (or software) for receiving and interpreting signals received via the wire 212 from a remote source. In some embodiments the uplink interface is the radio frequency transceiver 206 (embodiment illustrated in FIG. 3B) and a wired uplink interface 211 is not a part of the lighting fixture for data communication. In other embodiments both a wired uplink interface 211 and wireless uplink capabilities are provided in a lighting fixture's control system. Radio frequency transceiver 206 may include an encoder, a modulator, an amplifier, a demodulator, a decoder, an antenna, one or more filters, one or more buffers, one or more logic modules for interpreting received transmissions, and/or one or more logic modules for appropriately formatting transmissions. FIGS. 3B-4B further illustrate a wireless host module and other modules for facilitating the wireless access point activities and features described herein.

The circuit shown in FIG. 3A is shown as being entirely enclosed within mounting system 32 and as a single unit (e.g., single PCB, flexible PCB, separate PCB's but closely coupled). As previously mentioned, in other embodiments the circuit may be distributed (e.g., having some components outside of the mounting system, having some components within the fixture housing, etc.).

FIG. 3A is further shown to include an environment sensor 208. Environment sensor 208 is shown as located at the top of mounting system 32 in FIG. 3A. In other embodiments, environment sensor 208 may be installed within housing 30, to the underside of housing 30, or to any other part of outdoor lighting fixture 102. For example, in FIG. 1 the environment sensor 13 is shown as coupled to controller 16 which is wired to the lighting fixture via wire 14. In yet other embodiments, environment sensor 208 may be further remote from the fixture (e.g., coupled to a lower location on the pole, coupled to a street sign, coupled to a stop light, etc.). Environment sensor 208 may serve multiple lighting fixtures. In such embodiments environment sensor 208 provides output signals to multiple lighting fixtures or the environment sensor provides output signals to a single fixture's control circuitry (e.g., control circuit 210) which causes a representation of the sensor's output to be transmitted (e.g., via radio frequency transceiver 206) to other fixtures, to an uplink connection, or to a master controller 204 for action. Environment sensor 208 may be an occupancy sensor, a motion sensor, a photocell, an infrared sensor, a temperature sensor, or any other type of sensor for supporting the activities described herein. Control circuit 210 coupled to environment sensor 208 may be configured to cause lamps 240, 242 to illuminate when movement is detected or based on some other logic determination using sensor input. In an exemplary embodiment, control circuit 210 may also be configured to cause signals to be transmitted by radio frequency transceiver 206 to a security monitor observed by security personnel. Receipt of these signals may cause a system controlling a pan-tilt-zoom security camera to aim toward the area covered by a light. The signals (or other alerts) may also be sent to other locations (e.g., a police station for action, a security server on the Internet) via the lighting fixture's uplink connection. For example, if activity continues occurring in a parking lot after-hours, as detected by occupancy sensors on a system of lighting fixtures as described herein, the lighting fixtures can each communicate (wired, wirelessly, etc.) this activity to a master controller and the master controller may send a request for inspection to security or police. Control circuit 210 may also be configured to turn the lighting fixture on for a period of time prior to turning the lighting fixture off if no further occupancy is detected.

Figure 3B:
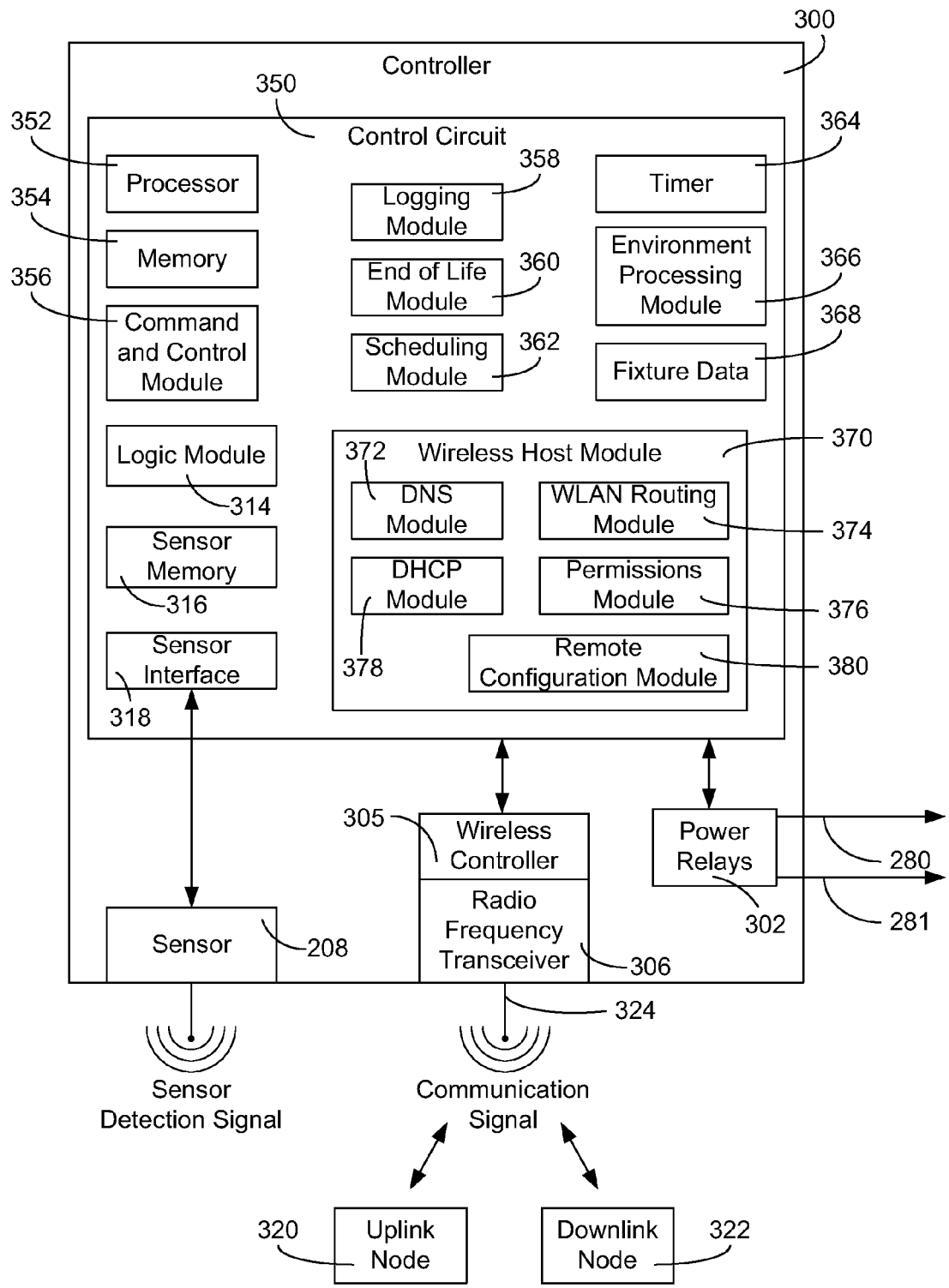
FIG. 3B is a block diagram of the controller and circuit of the system of FIG. 3A, according to an exemplary embodiment.

Referring now to FIG. 3B, a block diagram of a lighting fixture controller 300 is shown, according to an exemplary embodiment. Activities of circuit 350 are controlled or facilitated using one or more processors 352 (e.g., a programmable integrated circuit, a field programmable gate array, an application specific integrated circuit, a general purpose processor, a processor configured to execute instructions it receives from memory, etc.). In other embodiments, activities of circuit 350 are controlled and facilitated without the use of one or more processors and are implemented via a circuit of analog and/or digital electronics components. Memory 354 of circuit 350 may be computer memory, semiconductor-based, volatile, non-volatile, random access memory, flash memory, magnetic core memory, or any other suitable memory for storing information.

Circuit 350 is further shown to include radio frequency (RF) transceiver 306 and a sensor interface 318. RF transceiver 306 may be integrated with circuit 350 rather than being separate. RF transceiver 306 is a wire interface for communicating with existing municipal street light circuits and other networks (e.g., with uplink node 320 or downlink node 322, with an Internet service provider). In the present disclosure, the term transceiver may refer to an integrated transmitter and receiver pair or a separate transmitter and receiver.

Referring further to FIG. 3B, control circuit 350 is further shown to include wireless host module 370. Wireless host module 370 provides devices (e.g., nodes) communicating with RF transceiver 306 wireless access point features in a wireless network. In other words, using wireless host module 370, controller 300 generally and radio frequency transceiver 306 more particularly serve as a "hotspot" for the devices wirelessly communicating with controller 300. Wireless host module 370 allows devices to request a connection to a wireless network and responds to such requests by completing one or more tasks for providing the device with a functional connection. For example, devices connecting to the wireless access point may be authenticated by wireless host module 370 and given information that the device can use to communicate on the wireless network. The information given to the device may include security parameters, a default web page, preferred wireless channel information, an IP address, quality of service parameters, or other parameters that are used by the device to enable or optimize communication with the wireless access point. Wireless host module 370 may also provide the device with information that can be used to communicate with an uplink node (e.g., uplink node 320) or an uplink network (e.g., an Internet Service Provider, the Internet, a domain name server address, a proxy address, etc.).

Multiple controllers located on lighting fixtures around the wireless network may serve as additional "hotspots" in the wireless network. For example, controllers including wireless host module 370 may be "symmetrically" placed (e.g., spaced evenly apart from one another, or arranged in another manner such that wireless access to one of the controllers is always available) on various lighting fixtures of the lighting fixture system. In other embodiments the controllers including wireless host module 370 are not symmetrically placed on the various lighting fixtures.

Wireless host module 370 include various modules for providing the wireless access point features for the devices communicating with controller 300. For example, wireless host module 370 includes domain name system (DNS) module 372. DNS module 372 receives domain name information from the devices connecting to the wireless network and is configured to translate the domain name information into identifiers (e.g., IP addresses) to be used for locating and connecting to the various devices. DNS module 372 further provides the devices connected to controller 300 with a requested IP address based on the domain name information received. For example, the device may provide DNS module 372 with domain name information and DNS module 372 may search an uplink node or network for an IP address associated with the domain name information. DNS module 372 may then provide the device with the IP address or an error message or other message if the IP address could not be found. DNS module 372 may additionally use a DNS server or work in conjunction with the DNS server for searching for the IP address or other info. DNS module 372 may receive the IP address or other info from the remote DNS server and provide the IP address or other info to the device.

Wireless host module 370 further includes wireless local area network (WLAN) routing module 374. WLAN routing module 374 provides routing logic and services for the devices communicating with controller 300 (e.g., uplink node 320, downlink node 322). WLAN routing module 374 receives data from devices communicating with controller 300 and transfers the data to another point in the wireless network. For example, WLAN routing module 374 may receive the data and determine where to send the data in the network (e.g., to another controller of another lighting fixture or otherwise) so that the data is eventually received at its intended destination. WLAN routing module 374 may include routing tables, protocol translators, IP packet header parsers, or other routing information for determining how and where to route data. Further, when information is received from an uplink node (e.g., uplink node 320) or network (e.g., the Internet via uplink node 320), WLAN routing module 374 may use the routing tables or other logic to provide the inbound information to the correct device (e.g., downlink node 322) wirelessly connected to RF transceiver 306.

Wireless host module 370 further includes permissions module 376. Permissions module 376 allows or denies access to the wireless network and/or to controller 300 for devices wirelessly communicating with controller 300. Permissions module 376 may be configured to allow devices with the proper permissions or access rights to join the wireless "hotspot" provided by the lighting fixture controller 300. For example, permissions module 376 can grant permission to a device based on whether the device has previously registered with permissions module 376. Granting permission to a device can allow the device to communicate with the uplink node or network (e.g., the Internet). Permissions module 376 may check device or user credentials against permission information stored in a remote credentials server before allowing access to the uplink node or network. Permissions module 376 may further check security settings (or other settings) associated with the device before allowing access to the uplink node or network.

In some embodiments, the same connection to controller 300 that provides wireless access point features (e.g., for accessing the Internet) is also used for providing access to lighting fixture features. For example, permissions module 376 can allow or deny a user of a device (e.g., a maintenance person or other user responsible for the functionality of the lighting fixture system) to read a file or settings (e.g., lighting fixture settings), to modify a file or settings (e.g., modifying lighting fixture settings such as the state of the lighting fixture, a schedule of the lighting fixture, etc.), and/or execute a command for the lighting fixture. For example, permissions module 376 may authorize a user with the proper credentials to execute a command related to a lighting fixture status that overrides a scheduled state.

Wireless host module 370 further includes dynamic host configuration protocol (DHCP) module 378. DHCP module 378 receives a request to connect from the devices attempting to connect with controller 300 and provides the device with configuration information for connecting to controller 300. Configuration information may be retrieved from a configuration database and may include an IP address, subnet mask, default gateway, DNS server addresses, lease duration, or other information. DHCP module 378 may receive information from permissions module 376 (e.g., of whether to allocate an IP address, the type of lease to provide the device, the length of the lease to provide the device, etc.) to provide the device. For example, a device without the proper permissions or access rights may not be assigned an IP address on the network by DHCP module 378. While module 378 is shown as a DHCP module, other modules may be provided in place of a DHCP module 378 or in addition to DHCP module 378 for assigning addresses and for providing other configuration information to devices connecting to controller 300 as a wireless access point.

Wireless host module 370 further includes remote configuration module 380. Remote configuration module 380 receives configuration information from a remote source for the wireless access point and its parameters. The configuration information is used to optimize the wireless network settings for wireless controller 300, RF transceiver 306, and the wireless access point provided by controller 300.

Remote configuration module 380 can be a service such as a web service for providing user interfaces for the wireless access point. For example, remote configuration module 380 may receive login information from and provide configuration information to a web page of the remote source. A user of the remote source may then change the configuration information to configure or reconfigure the wireless access point features. Configuration information may include the wireless network name (e.g., the service set identifier (SSID)), security parameters (e.g., security information for wired equivalent privacy (WEP) encryption settings, Wi-Fi protected access (WPA) encryption settings, or settings for other security protocols), a password for allowing other devices to access the wireless network, preferred wireless channel information, quality of service parameters, etc.

Sensor interface 318 receives signals from environment sensor 208. Sensor interface 318 may include any number of jacks, terminals, solder points or other connectors for receiving a wire or lead from environment sensor 208. Sensor interface 318 may also or alternatively be a radio frequency transceiver or receiver for receiving signals from wireless environment sensors. For example, sensor interface 318 may be a Bluetooth protocol compatible transceiver, a ZigBee transceiver, or any other standard or proprietary transceiver. Regardless of the communication medium used, sensor interface 318 may include filters, analog to digital converters, buffers, or other components configured to modify signals received from environment sensor 208. Sensor interface 318 may be configured to provide the result of any signal transformation (or the raw signal output from environment sensor 208) to circuit 350 for further processing.

Circuit 350 is further shown to include a command and control module 356, a logging module 358, an end of life module 360, a scheduling module 362, a timer 364, an environment processing module 366, and fixture data 368. Using signals received from communications electronics of the lighting fixture and/or signals received from one or more sensors (e.g., photocells, occupancy sensors, etc.), command and control module 356 is configured to control the ballasts and lamps of the fixture. Command and control module 356 may include the primary control algorithm/loop for operating the fixture and may call, initiate, pass values to, receive values from, or otherwise use the other modules of circuit 350. For example, command and control module 356 may primarily operate the fixture using a schedule as described below with respect to scheduling module 362, but may allow upstream or peer control (e.g., "override control") to allow a remote source to cause the ballast/lamps to turn on or off. Command & control module 356 may be used to control 2-way communication using communications electronics of the lighting fixture.

Logging module 358 is configured to identify and store fixture event information. For example, logging module 358 may be configured to identify (e.g., by receiving a signal from another component of the circuit) when the lamps of the fixture are being or have been turned off or turned on. These events may be recorded by logging module 358 with a date/time stamp and with any other data. For example, logging module 358 may record each event as a row in a two dimensional table (e.g., implemented as a part of a relational database, implemented as a flat file stored in memory, etc.) with the fields such as event name, event date/time, event cause, event source. One module that may utilize such information is end of life module 360. End of life module 360 may be configured to compile a time of use total by querying or otherwise aggregating the data stored by logging module 358. Events logged by the system may be transmitted using the communications interfaces or other electronics to a remote source via a wired or wireless connection. Messages transmitting logged events or data may include an identifier unique to the lighting fixture (e.g., lighting fixture's communication hardware) that identify the fixture specifically. In addition to the activities of end of life module 360, command and control module 356 may be configured to cause communications electronics of the fixture to transmit messages from the log or other messages upon identifying a failure (e.g., a power supply failure, a control system failure, a ballast failure, a lamp failure, etc.). While logging module 358 may be primarily used to log on/off events, logging module 358 (or another module of the control system) may log energy draw (or some value derived from energy draw such as a carbon equivalent amount) by the lighting fixture.

FIG. 3B is further shown to include a scheduling module 362. Scheduling module 362 may be used by the circuit to determine when the lamps of the lighting fixture should be turned on or off. Scheduling module 362 may only consider time, or may also consider inputs received from environment sensor 208 (e.g., indicating that it is night out and that artificial light is necessary). Scheduling module 362 may access a schedule stored in memory 354 of circuit 350 to carry out its tasks. In some embodiments schedule data may be user-updatable via a remote source and transmitted to the fixture via the circuit and a communications interface. While end of life module 360 may utilize an actual log of fixture events as described in the previous paragraph, in some embodiments end of life module 360 may utilize scheduling information to make an end of life determination. In yet other embodiments, logging module 358 may receive data from scheduling module 362 to create its log. Controller 300 and circuit 350 is further shown to include a timer 364 that may be used by circuit 350 to maintain a date/time for use by or for checking against information of scheduling module 362, end of life module 360, or logging module 358. Environment processing module 366 may be configured to process signals received from one or more sensors such as environment sensor 208. Environment processing module 366 may be configured to, for example, keep the lamp of the lighting fixture turned off between the hours of one and five A.M. if there is no movement detected by a nearby environment sensor. In other embodiments, environment sensing module 366 may interpret the signals received from sensors but may not make final fixture behavior determinations. In such embodiments, a main logic module for the circuit or logic included in processor 352 or memory 354 may make the fixture behavior determinations using input from, for example, environment processing module 366, scheduling module 362, timer 364, and fixture data 368.

Referring further to FIG. 3B, controller 300 includes circuitry configured with an algorithm to control on/off cycling of connected lighting fixtures, an algorithm to log usage information for the lighting fixture, an algorithm configured to prevent premature restrikes to limit wear on the lamps and ballast, and an algorithm configured to allow controller 300 to send and receive commands or information from other peer devices independently from a master controller or master transceiver.

Controller 300 is shown to include power relays 302 configured to controllably switch on or off high voltage power outputs that may be provided to first ballast 244 and second ballast 246 of FIG. 3A via wires 280, 281. It should be noted that in other exemplary embodiments, power relays 302 provide a low voltage control signal, optical signal, or otherwise to the lighting fixture which may cause one or more ballasts, lamps, and/or circuits of the fluorescent lighting fixture that controller 300 serves to turn on and off. Controller 300 may further include a port, terminal, receiver, or other input for receiving power from a high voltage power source (e.g., a power input wire received through the street light pole). In embodiments where a relatively low voltage or no voltage control signal is provided by relays 302, power for circuitry of controller 300 may be received from a power source provided to the lighting fixtures or from another source. In any embodiment of controller 300, appropriate power supply circuitry (e.g., filtering circuitry, stabilizing circuitry, etc.) may be included with controller 300 to provide power to the components of controller 300 (e.g., relays 302).

Referring still to FIG. 3B, controller 300 is shown to include wireless controller 305 and RF transceiver 306 which may transmit data to control circuit 350. Control circuit 350 may provide data or control signals received from RF transceiver 306 and wireless controller 305 to power relays 302. Control circuit 350 is configured to cause one or more lamps of the fluorescent lighting fixture to turn on and off by controllably providing control signals to power relays 302. Control circuit 350 can make a determination that an "on" or "off" signal should be sent to power relays 302 based on inputs received from RF transceiver 306. For example, a command to turn the lighting fixture "off" may be received at wireless transceiver 306 and interpreted by wireless controller 305 and control circuit 350 (e.g., by logic module 314, by command and control module 356, etc.). Upon recognizing the "off" command, control circuit 305 causes a switch of one or more of power relays 302 off. Similarly, when sensor 208 experiences an environmental condition, logic module 314 may determine whether or not controller 300 and/or wireless controller 305 should change "on/off" states. For example, if a high ambient lighting level is detected by sensor 208, logic module 314 may determine that wireless controller 305 should change states such that power relays 302 are "off." Conversely, if a low ambient lighting level is detected by sensor 208, logic module 314 may cause control circuit 350 to provide an "on" signal to power relays 302. Other control decisions, logic and activities provided by controller 300 and the components thereof are described below and with reference to other Figures.

When or after control decisions based on sensor 208 or commands received at RF transceiver 306 are made, in some exemplary embodiments, logic module 314 is configured to log usage information for the lighting fixture in sensor memory 316. For example, if control circuit 350 causes power relays 302 to change states such that the lighting fixture turns on or off, logic module 314 may log usage information based on the information from wireless controller 305. The form of the logged usage information can vary for different embodiments. For example, in some embodiments, the logged usage information includes an event identifier (e.g., "on", "off", cause for the state change, etc.) and a timestamp (e.g., day and time) from which total usage may be derived. In other embodiments, the total "on" time for the lighting fixture (or lamp set) is counted such that only an absolute number of hours that the lamp has been on (for whatever reason) has been tracked and stored as the logged usage information. In addition to logging or aggregating temporal values, each logic module 314 may be configured to process usage information or transform usage information into other values or information. For example, in some embodiments time-of-use information is transformed by logic module 314 to track the energy used by the lighting fixture (e.g., based on bulb ratings, known energy draw of the fixture in different on/off/partial on modes, etc.). In some embodiments, each logic module 314 will also track how much energy savings the lighting fixture is achieving relative to a conventional lighting fixture, conventional control logic, or relative to another difference or change of the lighting fixture. For the purposes of many embodiments of this application, any such information relating to usage for the lighting fixture may be considered logged "usage information." In other embodiments, the usage information logged by module 314 is limited to on/off events or temporal aggregation of on states; in such embodiments energy savings calculations or other calculations may be completed by a master controller 202 or another remote device.

In an exemplary embodiment, controller 300 (e.g., via wireless transceiver 306) is configured to transmit the logged usage information to remote devices such as master controller 202. Control circuit 350 may be configured to recall the logged usage information from sensor memory 316 at periodic intervals (e.g., every hour, once a day, twice a day, etc.) and to provide the logged usage information to wireless controller 305 and RF transceiver 306 at the periodic intervals for transmission back to master controller 202. In other embodiments, master controller 202 (or another network device) transmits a request for the logged information to RF transceiver 306 and the request is responded to by wireless controller 305 and control circuit 350 by transmitting back the logged usage information. In a preferred embodiment a plurality of controllers such as controller 300 asynchronously collect usage information for their fixture and master controller 202, via request or via periodic transmission of the information by the controllers, and gathers the usage information for later use.

Wireless controller 305 may be configured to resolve situations or events such as transmission failures, reception failures, and the like. Wireless controller 305 may respond to such failures by, for example, operating according to a retransmission scheme or another transmit failure mitigation scheme. Wireless controller 305 may also control any other modulating, demodulating, coding, decoding, routing, or other activities of RF transceiver 306.

Controller 300's control logic may periodically include making transmissions to other controllers in a zone, making transmissions to particular controllers, or otherwise. Such transmissions can be controlled by wireless controller 305 and such control may include, for example, maintaining a token-based transmission system, synchronizing clocks of the various RF transceivers or controllers, operating under a slot-based transmission/reception protocol, or otherwise.

Referring still to FIG. 3B, sensor 208 may be an infrared sensor, an optical sensor, a camera, a temperature sensor, a photodiode, a carbon dioxide sensor, or any other sensor configured to sense environmental conditions such as a lighting level or human occupancy of a space. For example, in one exemplary embodiment, sensor 208 is a motion sensor and logic module 314 is configured to determine whether wireless controller 305 should change states (e.g., change the state of power relays 302) based on whether motion is detected by sensor 208 (e.g., detected motion reaches or exceeds threshold value). In the same or other embodiments, logic module 314 may be configured to use the signal from the sensor 208 to determine an ambient lighting level. Logic module 314 may then determine whether to change states based on the ambient lighting level. For example, logic module 314 may use a condition such as time of day in addition to ambient lighting level to determine whether to turn the lighting fixture off or on. During a critical time of the day (e.g., during rush hour during the winter months), even if the ambient lighting level is high, logic module 314 may refrain from turning the lighting fixture off. In another embodiment, by way of further example, logic module 314 is configured to provide a command to turn the one or more lamps of the fluorescent lighting fixture on when logic module 314 detects motion via the signal from sensor 208 and when logic circuit 314 determines that the ambient lighting level is below a threshold setpoint.

Referring yet further to FIG. 3B, control circuit 350 is configured to prevent damage to lamps 240, 242 from manual or automatic control activities. Particularly, control circuit 350 may be configured to prevent on/off cycling of lamps 240, 242 by holding the lamps in an "on" state for a predefined period of time (e.g., thirty minutes, fifteen minutes, etc.) even after the condition that caused the lamp to turn on is no longer true. Accordingly, if, for example, a low ambient lighting level causes control circuit 350 to turn lamps 240, 242 on but then the ambient lighting level suddenly increases (the sun comes out), control circuit 350 may keep the lamps on (even though the on condition expired) for a predetermined period of time so that the lamps are taken through their preferred cycle. Similarly, control circuit 350 may be configured to hold the lamp in an "off" state for a predefined period of time since the lamp was last turned off to ensure that the lamp is given time to cool or otherwise settle after the last "on" state.

Referring yet further to FIG. 3B, logic module may be configured to include a restrike violation module (e.g., in memory 316) that is configured to prevent a command from control circuit 350 to cause the fluorescent lamps to turn on while a restrike time is counted down. The restrike time may correspond with a maximum cool-down time for the lamp—allowing the lamp to experience its preferred strike-up cycle even if a command to turn the lamp back on is received at RF transceiver 306. In other embodiments, logic module 314 may be configured to prevent rapid on/off switching due to sensed motion, another environmental condition, or a sensor or controller error. Logic module 314 may be configured to, for example, entirely discontinue the on/off switching based on inputs received from the sensor by analyzing the behavior of the sensor, the switching, and a logged usage information. By way of further example, logic module 314 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.).

Logic module 314 may be configured to log or communicate such a determination. Using such configurations, logic module 314 is configured to self-diagnose and correct undesirable behavior that would otherwise continue occurring based on the default, user, or system-configured settings.

According to one embodiment, a self-diagnostic feature would monitor the number of times that a fixture or device was instructed to turn on (or off) based upon a signal received from a sensor (e.g. motion, ambient light level, etc.). If the number of instructions to turn on (or off) exceeded a predetermined limit during a predetermined time period, logic module 314 could be programmed to detect that the particular application for the fixture or device is not well-suited to control by such a sensor (e.g. not an optimum application for motion control or ambient light-based control, etc.), and would be programmed to disable such a motion or ambient light based control scheme, and report/log this action and the basis. For example, if the algorithm is based on more than four instructions to turn on (or off) in a 24 hour period, and the number of instructions provided based on signals from the sensor exceeds this limit within this period, the particular sensor-based control function would be disabled, as not being optimally suited to the application and a notification would be logged and provided to a user or facility manager. Of course, the limit and time period may be any suitable number and duration intended to suit the operational characteristics of the fixture/device and the application. In the event that a particular sensor-based control scheme in a particular zone is disabled by the logic module and/or control circuit, the fixture or device is intended to remain operational in response to other available control schemes (e.g. other sensors, time-based, user input or demand, etc.). The data logged by logic module 314 may also be used in a 'learning capacity' so that the controls may be more optimally tuned for the fixtures/devices in a particular application and/or zone. For example, logic module 314 may determine that disablement of a particular sensor-based control feature occurred due to an excessive number of instructions to turn on (or off) based on signals from a particular sensor that occurred within a particular time window, and may be reprogrammed to establish an alternate monitoring duration that excludes this particular time window for the particular sensor-based control scheme to 'avoid' time periods that are determined to be problematic. This ability to learn or self-update is intended to permit the system to adjust itself to update the sensor-based control schemes to different time periods that are more optimally suited for such a control scheme, and to avoid time periods that are less optimum for such a particular sensor-based control scheme.

Figure 4A:
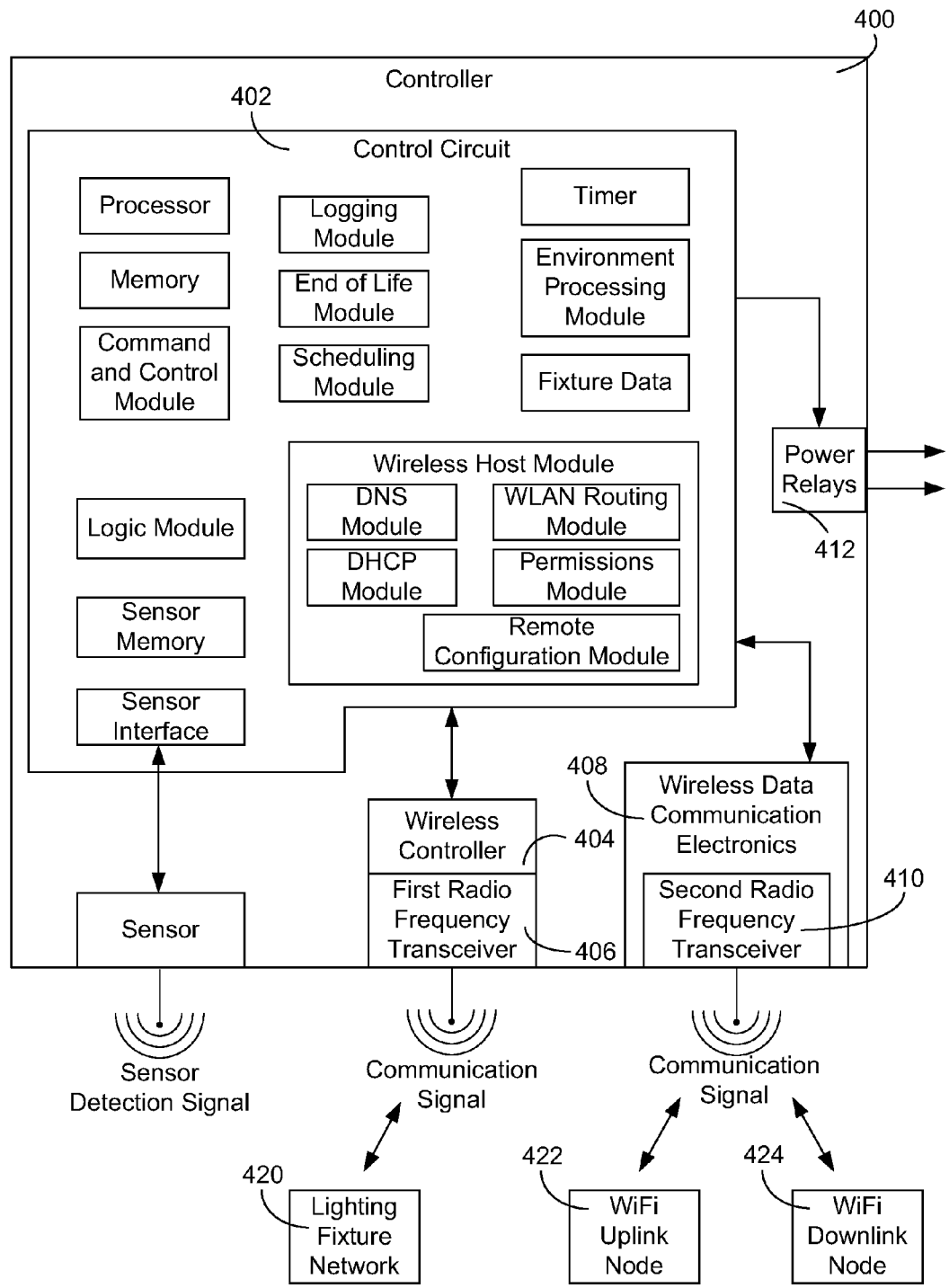
FIG. 4A is a block diagram of the controller and circuit of the system of FIG. 3A, according to another exemplary embodiment.

Referring now to FIG. 4A, a block diagram of an alternative lighting fixture system for providing wireless network communication is shown. In the embodiment of FIG. 4A, controller 400 includes a first radio frequency transceiver 406 and a second radio frequency transceiver 410 instead of a single transceiver as shown in the embodiment of FIG. 3B. First RF transceiver 406 may be configured to communicate wirelessly with lighting fixture network 420 while second RF transceiver 410 may be configured to send and receive data to/from WiFi uplink node 422 and WiFi downlink node 424.

Controller 400 includes wireless data communication electronics 408 including second radio frequency transceiver 410 for sending and receiving data from nodes 422, 424. Wireless controller 404 and first RF transceiver 406 may have the same functionality as wireless controller 305 and RF transceiver 306 of FIG. 3B, with respect to lighting system communication. Communications between nodes 422, 424 and lighting fixture network 420 may be substantially separated via the dual transceiver embodiment of FIG. 4A. According to an exemplary embodiment, transceivers 406, 410 may have different transmission and reception ranges, different bandwidths, different upload and download speeds, different ports and communication protocols, or other properties.

Figure 4B:
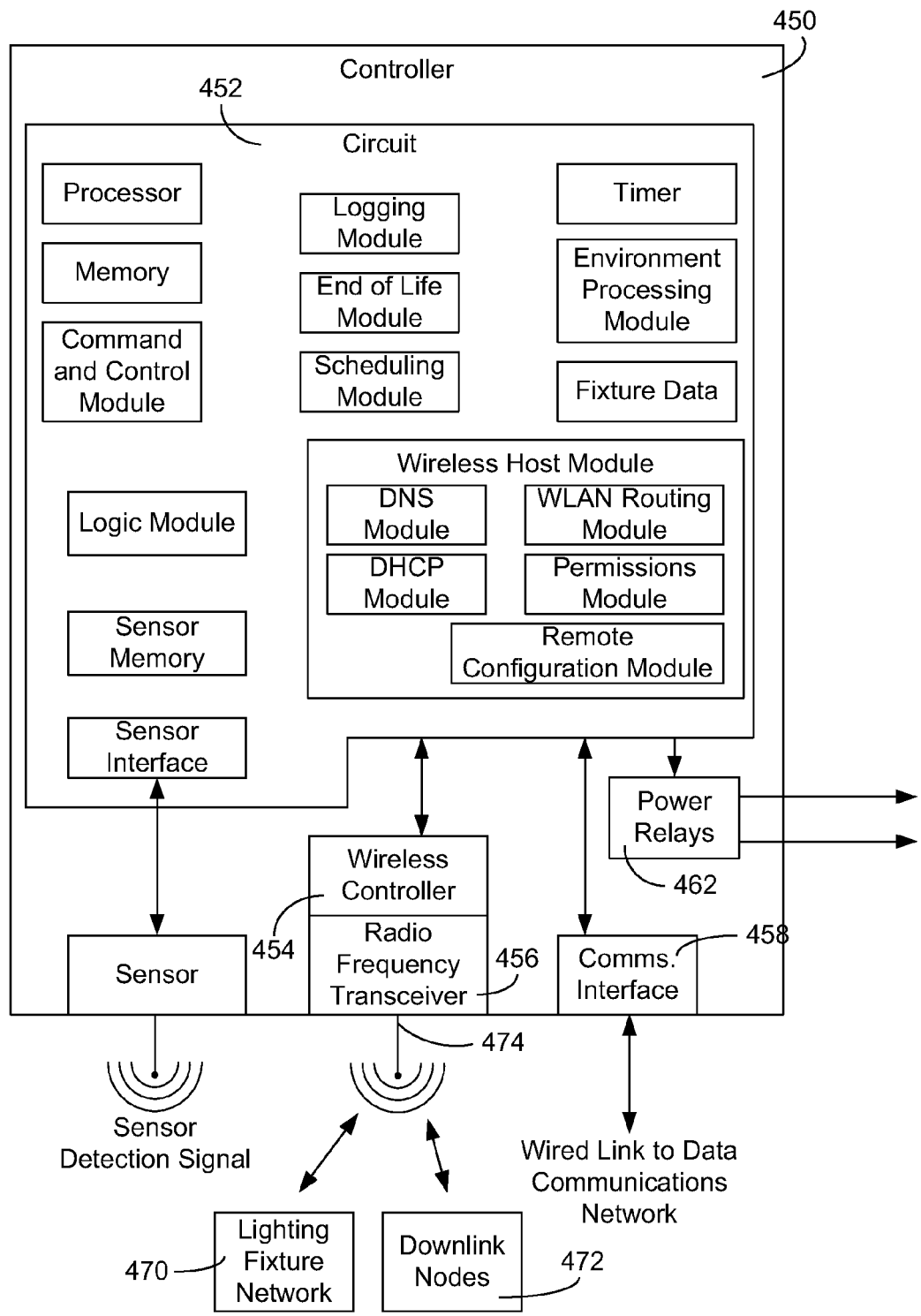
FIG. 4B is a block diagram of the controller and circuit of the system of FIG. 3A, according to yet another exemplary embodiment.

Referring now to FIG. 4B, a block diagram of another alternative lighting fixture system for providing wireless network communications is shown. In the embodiment of FIG. 4B, controller 450 includes communications interface 458 in addition to RF transceiver 456. In the embodiment of FIG. 4B, communications interface 458 is configured to handle uplink communications while RF transceiver 456 is configured to handle downlink communications. Communications interface 458 provides an uplink to a data communications network (e.g., data communications network 110 of FIG. 3A). Controller 450 includes wireless controller 454 and RF transceiver 456 which may receive and transmit data to/from lighting fixture network 470 and downlink nodes 472 via link 474.

Figure 5:
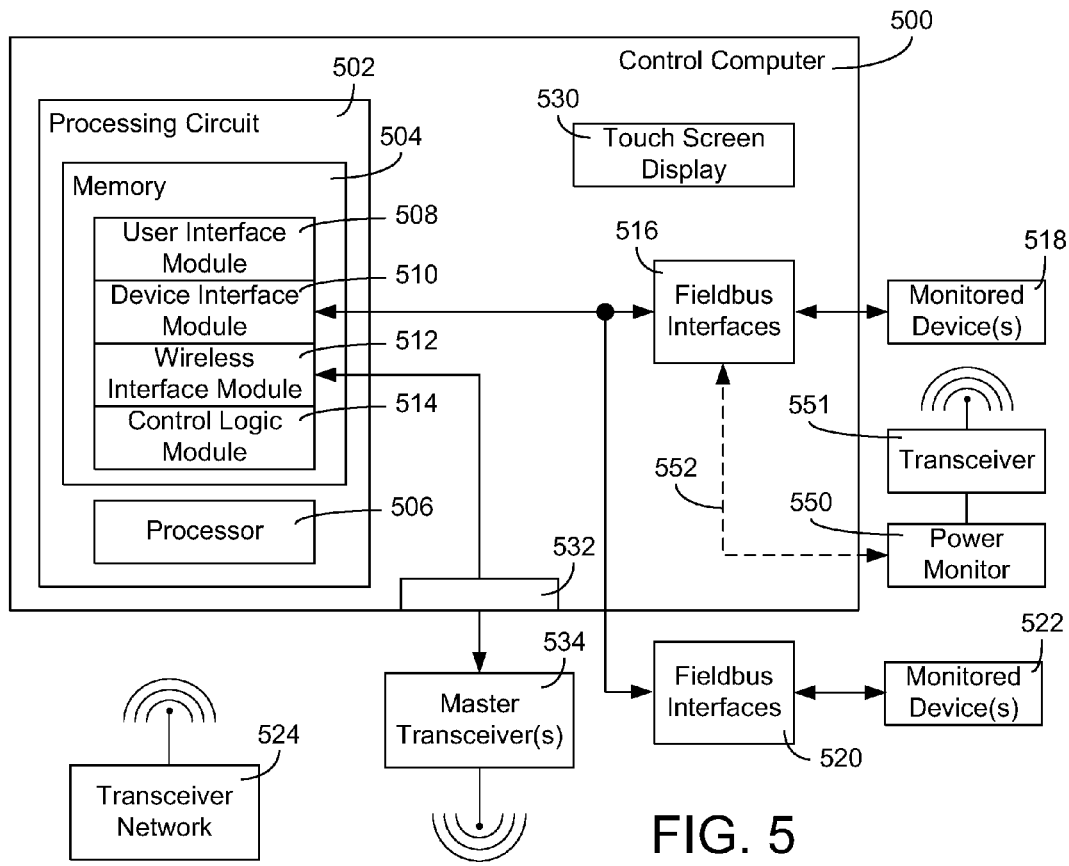
FIG. 5 is a more detailed block diagram of the control computer, according to an exemplary embodiment.

Referring now to FIG. 5, a more detailed block diagram of control computer 500 is shown, according to an exemplary embodiment. Control computer 500 may be configured as the "master controller" described in U.S. application Ser. No. 12/240,805, filed Sep. 29, 2008, and incorporated herein by reference in its entirety. Control computer 500 is generally configured to receive user inputs (e.g., via touchscreen display 530) and to set or change settings of the lighting system based on the user inputs. Control computer 500 may further be configured to set user permissions, device permissions, quality of service parameters or other parameters that affect the wireless communications network or "hotspots" provided by the lighting fixtures (e.g., configuration settings from remote configuration module 380 of FIG. 3B, etc.). For example, a map shown on a display of control computer 500 may include rings that illustrate the expected wireless coverage area for each lighting fixture that provides hotspot features. The user may be able to remotely boost power by, e.g., clicking on an icon associated with a particular lighting fixture and boosting amplifier power via a slider. The user may be instructed, e.g., via a dialog box shown on the computer screen, only to boost power for each wireless transmitter to reach a location that cannot be reached by installing another hotspot. In other exemplary embodiments control computer 500 may automatically set or "balance" the transmit power of adjacent lighting fixtures to provide for maximum coverage while minimizing the chance of one transmitter dominating the other or causing too much radio frequency interference. Further, control computer 500 may be used to adjust bandwidth parameters, the maximum number of users per hotspot, and the like.

Referring further to FIG. 5, control computer 500 is shown to include processing circuit 502 including memory 504 and processor 506. In an exemplary embodiment, control computer 500 and more particularly processing circuit 502 are configured to run a Microsoft Windows Operating System (e.g., XP, Vista, etc.) and are configured to include a software suite configured to provide the features described herein. The software suite may include a variety of modules (e.g., modules 508-514) configured to complete various activities of control computer 500. Modules 508-514 may be or include computer code, analog circuitry, one or more integrated circuits, or another collection of logic circuitry. In various exemplary embodiments, processor 506 may be a general purpose processor, a specific purpose processor, a programmable logic controller (PLC), a field programmable gate array, a combination thereof, or otherwise and configured to complete, cause the completion of, and/or facilitate the completion of the activities of control computer 500 described herein. Memory 504 may be configured to store historical data received from lighting fixture controllers or other devices, configuration information, schedule information, setting information, zone information, or other temporary or archived information. Memory 504 may also be configured to store computer code for execution by processor 506. When executed, such computer code (e.g., stored in memory 504 or otherwise, script code, object code, etc.) configures processing circuit 502, processor 506 or more generally control computer 500 for the activities described herein.

Touch screen display 530 and more particularly user interface module 508 are configured to allow and facilitate user interaction (e.g., input and output) with control computer 500. It should be appreciated that in alternative embodiments of control computer 500, the display associated with control computer 500 may not be a touch screen, may be separated from the casing housing the control computer, and/or may be distributed from the control computer and connected via a network connection (e.g., Internet connection, LAN connection, WAN connection, etc.). Further, it should be appreciated that control computer 500 may be connected to a mouse, keyboard, or any other input device or devices for providing user input to control computer 500. Control computer is shown to include a communications interface 532 configured to connect to a wire associated with master transceiver 534.

Communications interface 532 may be a proprietary circuit for communicating with master transceiver 534 via a proprietary communications protocol. In other embodiments, communications interface 532 may be configured to communicate with master transceiver 534 via a standard communications protocol. For example, communications interface 532 may include Ethernet communications electronics (e.g., an Ethernet card) and an appropriate port (e.g., an RJ45 port configured for CAT5 cabling) to which an Ethernet cable is run from control computer 500 to master transceiver 534. Master transceiver 534 may be as described in U.S. application Ser. Nos. 12/240,805, 12/057,217, or 11/771,317 which are each incorporated herein by reference. Communications interface 532 and more generally master transceiver 534 are controlled by logic of wireless interface module 512. Wireless interface module 512 may include drivers, control software, configuration software, or other logic configured to facilitate communications activities of control computer 500 with lighting fixture controllers. For example, wireless interface module 512 may package, address format, or otherwise prepare messages for transmission to and reception by particular controllers or zones. Wireless interface module 512 may also interpret, route, decode, or otherwise handle communications received at master transceiver 534 and communications interface 532. Master transceiver 534 may wirelessly communicate with transceiver network 524 and receive and send data.

Referring still to FIG. 5, user interface module 508 may include the software and other resources for the display and the handling of automatic or user inputs received at the graphical user interfaces of control computer 500. While user interface module 508 is executing and receiving user input, user interface module 508 may interpret user input and cause various other modules, algorithms, routines, or sub-processes to be called, initiated, or otherwise affected. For example, control logic module 514 and/or a plurality of control sub-processes thereof may be called by user interface module 508 upon receiving certain user input events. User interface module 508 may also be configured to include server software (e.g., web server software, remote desktop software, etc.) configured to allow remote access to the display. User interface module 508 may be configured to complete some of the control activities described herein rather than control logic module 514. In other embodiments, user interface module 508 merely drives the graphical user interfaces and handles user input/output events while control logic module 514 controls the majority of the actual control logic.

Control logic module 514 may be the primary logic module for control computer 500 and may be the main routine that calls, for example, modules 508, 510, etc. Control logic module 514 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 514 operates based off of information stored in one or more databases of control computer 500 and stored in memory 504 or another memory device in communication with control computer 500. The database may be populated with information based on user input received at graphical user interfaces and control logic module 514 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 514 as control logic module 514 proceeds through its various control algorithms.

Control logic module 514 may include any number of functions or sub-processes. For example, a scheduling sub-process of control logic module 514 may check at regular intervals to determine if an event is scheduled to take place. When events are determined to take place, the scheduling sub-process or another routine of control logic module 514 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 534. Control logic module 514 may also be configured to conduct or facilitate the completion of any other process, sub-process, or process steps conducted by control computer 500 described herein.

Referring further to FIG. 5, device interface module 510 facilitates the connection of one or more field devices, sensors, or other inputs not associated with master transceiver 534. For example, fieldbus interfaces 516, 520 may be configured to communicate with any number of monitored devices 518, 522. The communication may be according to a communications protocol which may be standard or proprietary and/or serial or parallel. Fieldbus interfaces 516, 520 can be or include circuit cards for connection to processing circuit 502, jacks or terminals for physically receiving connectors from wires coupling monitored devices 518, 522, logic circuitry or software for translating communications between processing circuit 502 and monitored devices 518, 522, or otherwise. In an exemplary embodiment, device interface module 510 handles and interprets data input from the monitored devices and controls the output activities of fieldbus interfaces 516, 520 to monitored devices 518, 522.

Fieldbus interfaces 516, 520 and device interface module 510 may also be used in concert with user interface module 508 and control logic module 514 to provide control to the monitored devices 518, 522. For example, monitored devices 518, 522 may be mechanical devices configured to operate a motor, one or more electronic valves, one or more workstations, machinery stations, a solenoid or valve, or otherwise.

Such devices may be assigned to zones similar to the lighting fixtures described above and below or controlled independently. User interface module 508 may allow schedules and conditions to be established for each of devices 518, 522 so that control computer 500 may be used as a comprehensive energy management system for a facility. For example, a motor that controls the movement of a spinning advertisement may be coupled to the power output or relays of a controller very similar if not identical to controller 300. This controller may be assigned to a zone (e.g., via user interfaces at touchscreen display 530) and provided a schedule for turning on and off during the day. In another embodiment, the electrical relays of the controller may be coupled to other devices such as video monitors for informational display, exterior signs, task lighting, audio systems, or other electrically operated devices.

Referring further to FIG. 5, power monitor 550 is shown as coupled to fieldbus interfaces 516 in an exemplary embodiment. However, power monitor 550 may also or alternatively be coupled to its own controller or RF transceiver 551 for communicating with master transceiver 534. Power monitor 550 may generally be configured to couple to power resources (e.g., a facility power outlet, a mains input to a lighting system, a building power meter, etc.) and to receive or calculate an indication of power utilized by the a facility (e.g., building, parking lot full of lights, a zone of street lights, etc.). This input may be received in a variety of different ways according to varying embodiments. For example, power monitor 550 may include a current transformer (CT) configured to measure the current in the mains inlet to a facility, may be coupled to or include a pulse monitor, may be configured to monitor voltage, or may monitor power in other ways. Power monitor 550 is intended to provide "real time" or "near real time" monitoring of power and to provide the result of such monitoring to control computer 500 for use or reporting. When used with power monitor 550, control logic module 514 may be configured to include logic that sheds loads (e.g., sends off signals to lighting fixtures via a lighting fixture controller network, sends off signals to monitored devices 518, 522, adjusts ambient light setpoints, adjusts schedules, shuts lights off according to a priority tier, etc.) to maintain a setpoint power meter level or threshold. In other exemplary embodiments, control logic module 414 may store or receive pricing information from a utility and shed loads if the metered power usage multiplied by the pricing rate is greater than certain absolute thresholds or tiered thresholds. For example, if daily energy cost is expected to exceed $500 for a facility or outdoor system, control logic module 514 may be configured to change the ambient light setpoints for the lighting fixtures in the facility or system until daily energy cost is expected to fall beneath $500. In an exemplary embodiment, user interface module 408 is configured to cause a screen to be displayed that allows a user to associate different zones or lighting fixtures with different demand/response priority levels. Accordingly, a utility provider or internal calculation determines that a load should be shed, control logic module 514 will check the zone or lighting fixture database to shed loads of the lowest priority first while leaving higher priority loads unaffected.

Figure 6:
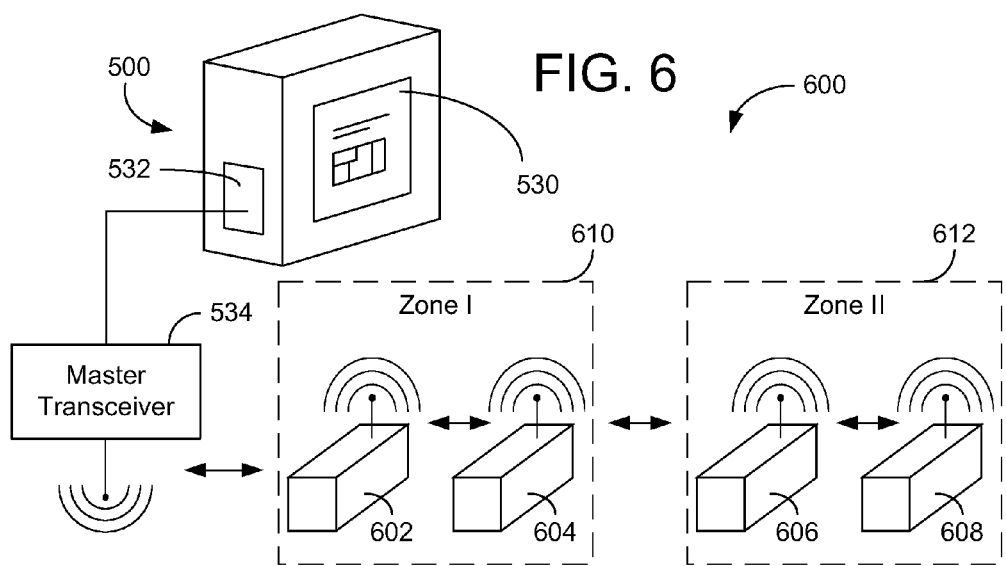
FIG. 6 is a diagram of a facility lighting system for use with the lighting fixture system, according to an exemplary embodiment.

Referring now to FIG. 6, a diagram of a facility lighting system 600 for use with the lighting fixture system including controller 300 and lighting fixture 102 is shown, according to an exemplary embodiment. Facility lighting system 600 is shown to include control computer 500 that is configured to conduct or coordinate control activities relative to multiple lighting fixture controllers such as controller 300.

Control computer 500 is preferably configured to provide a graphical user interface to a local or remote electronic display screen for allowing a user to adjust control parameters, turn lighting fixtures on or off, or to otherwise affect the operation of lighting fixtures in a facility. For example, control computer 500 is further shown to include touch screen display 530 for displaying such a graphical user interface and for allowing user interaction (e.g., input and output) with control computer 500. Various exemplary graphical user interfaces for display on touch screen display 530 and control activities associated therewith are described in subsequent paragraphs and with reference to subsequent Figures of the present disclosure. For example, touch screen display 530 provides a display such that a user of display 530 may change wireless network settings, lighting fixture settings, or otherwise. Wireless host module 370 of FIG. 3B may provide configuration settings for touch screen display 530 to display, and the user may use display 530 to modify the settings. Display 530 may further provide a user interface for a user attempting to connect to the wireless network for accepting login information or other authentication information.

It should be noted that while control computer 500 is shown in FIG. 6 as housed in a wall-mounted panel it may be housed in or coupled to any other suitable computer casing or frame. The user interfaces are intended to provide an easily configurable lighting and/or energy management system for a facility. The user interfaces are intended to allow even untrained users to reconfigure or reset a lighting system using relatively few clicks. In an exemplary embodiment, the user interfaces do not require a keyboard for entering values. Advantageously, users other than engineers may be able to setup, interact with, or reconfigure the system using the provided user interfaces.

Referring further to FIG. 6, control computer 500 is shown as connected to master transceiver 534 via communications interface 532. Master transceiver 534 may be a radio frequency transceiver configured to provide wireless signals to a network of controllers such as controller 300. In FIG. 6, master transceiver 534 is shown in bi-directional wireless communication with a plurality of lighting fixture controllers 602, 604, 606, 608. FIG. 6 further illustrates controllers 602, 604 forming a first logical group 610 identified as "Zone I" and controllers 606, 608 forming a second logical group 612 identified as "Zone II." Control computer 500 may be configured to provide different processing or different commands for zone 610 relative to zone 612, may be configured to provide different commands for each individual controller 602, 604, 606, 608, or may be configured to provide the same command for all lighting fixtures of both zones 610, 612. While control computer 500 is configured to complete a variety of control activities for lighting fixture controllers 602, 604, 606, 608, in many exemplary embodiments of the present disclosure, each controller associated with a lighting fixture (e.g., controllers 602, 604, 606, 608) includes circuitry configured to provide a variety of "smart" or "intelligent features" that are either independent of control computer 500 or operate in concert with control computer 500. For example, controller 602 may receive a command from control computer 500 regarding a lighting fixture status and may determine whether to execute the command or to ignore the command (e.g., a command to change the status of a lighting fixture between illuminated, dimmed, and off may be ignored if a vehicle is detected by a sensor associated with controller 602). Further, controllers 602, 604, 606, 608 may provide data to control computer 500 via master transceiver 534 (e.g., lighting fixture status, sensor data, wireless network data, etc.).

It should be noted that throughout this disclosure terms relating to the words radio frequency (e.g., "radio frequency transceiver," "radio frequency," "RF," etc.) may refer to any number of frequency bands or technologies according to various exemplary embodiments. For example, the outdoor lighting fixture and particularly its radio frequency transceiver may operate on any frequency or set of multiple frequencies of the electromagnetic spectrum that may enable wireless communications. According to various exemplary embodiments, the radio frequency transceivers may be of any number of wireless communication technologies (e.g., wireless LAN, wireless WAN, Bluetooth, ZigBee, WiFi, WiMax, etc.). According to various exemplary embodiments, the radio frequency transceivers may be implemented to, with, and/or by any wireless data communication technology of the past, present or future capable of enabling wireless communications.

While many of the embodiments described herein relate primarily to outdoor lighting systems, various systems and methods of the present disclosure may be applied to indoor lighting systems. For example, a system of indoor lighting fixtures may include a first indoor lighting fixture and second indoor lighting fixture. The first indoor lighting fixture can include a first housing and a first radio frequency transceiver mounted to the first housing. The second indoor lighting fixture includes a second housing and a second radio frequency transceiver mounted to the second housing. The first indoor lighting fixture includes wireless routing circuitry and a wired uplink to a data communications network. The second radio frequency transceiver is configured to extend the range of the first radio frequency transceiver by forwarding data communications to and from the first radio frequency transceiver. In another embodiment, an indoor lighting fixture includes at least a first ballast for controllably providing power to at least one lamp for illuminating an indoor area (e.g., building zone, building space, one of a plurality of rooms, etc.). The indoor lighting fixture further includes a housing, a radio frequency transceiver, an antenna coupled to the radio frequency transceiver and extending away from the housing, and a control circuit that operates the radio frequency transceiver as a wireless router for wireless network communications. Via the radio frequency transceiver, the antenna, and the control circuit, the indoor lighting fixture may be configured to provide a wireless access point to devices (e.g., mobile phones, computers, laptops, PDAs, etc.) within an indoor building space. The control circuit may be configured to use the radio frequency transceiver for a network communications uplink and a network communications downlink. The control circuit may further be configured to distinguish messages for the indoor lighting fixture from communications for routing. The control circuit may further be configured to parse the messages for the indoor lighting fixture to determine whether the control circuit should cause the first ballast to change illumination states of the at least one lamp. The control circuit and the radio frequency transceiver may be wired to the power source for the indoor lighting fixture. The radio frequency transceiver may be at least one of a WiFi and a WiMax compatible transceiver. The control circuit may further include a security module that checks a credential of a remote device attempting to connect to the radio frequency transceiver. Alternative embodiments of the present application can further include a method for providing in-building wireless network connectivity. The method can include coupling a plurality of indoor lighting fixtures to indoor lighting locations and establishing a wireless network of indoor lighting fixtures by configuring radio frequency transceivers of the plurality of indoor lighting fixtures to serve as wireless network access points. It should further be noted that an indoor lighting fixture system having a wireless network may be joined with an outdoor lighting fixture network as variously described in this application. Accordingly, communications may be routed from indoor devices and indoor lighting fixtures to outdoor lighting fixtures and outdoor devices and vice versa. Yet further, information may be routed from devices inside a first facility to devices inside a second facility via a first indoor lighting network at the first facility, an outdoor lighting network as described herein, and a second indoor lighting network at the second facility. In such embodiments, the outdoor lighting fixture network may serve as the conduit via which wireless communications travel from the first facility to the second facility and vice versa. In other embodiments, the second indoor lighting network is not present but a conventional wireless access point exists within the second building. The conventional wireless access point communicates with devices in the first building by communicating via the outdoor lighting network and the indoor lighting network of the first building.

In some exemplary embodiments, the radio frequency transceivers integrated with the lighting fixtures can include logic for wirelessly communicating with phone handsets (e.g., special purpose in-building wireless handsets, mobile phones having voice over WiFi or voice over IP services, etc.). In an indoor environment, the phone handsets can therefore communicate with a voice network even if cellular reception within the building is poor. To implement such a system, the lighting fixture may include two transceivers, a first transceiver for lighting fixture communications and a second transceiver for voice communications with mobile handsets within proximity of the second transceiver. In other embodiments, the same transceiver is used for lighting fixture communications and voice communications. In varying embodiments, some of the lighting fixtures can be designated as voice routers (only configured to help distribute voice data throughout the wireless network of lighting fixtures) while other lighting fixtures are configured to send and receive data to and from the mobile handsets. Yet other lighting fixtures can both serve as a phone communications router and as an access point for communicating with mobile handsets. The different types of lighting fixtures may be staggered or distributed throughout a ceiling such that the nodes that can communicate with the mobile handsets provide good coverage of a target building space.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An outdoor lighting fixture comprising:
   at least a first ballast for controllably providing power to at least one lamp for illuminating an outdoor area;
   a housing;
   a radio frequency transceiver;
   an antenna coupled to the radio frequency transceiver and extending away from the housing; and
   a control circuit that operates the radio frequency transceiver as a wireless router for wireless network communications, wherein the control circuit is configured to wirelessly connect one or more computing devices proximate to the outdoor lighting fixture to a communications network using the radio frequency transceiver as a wireless router.

2. The outdoor lighting fixture of claim 1, wherein the control circuit is configured to use the radio frequency transceiver for a network communications uplink and a network communications downlink.

3. The outdoor lighting fixture of claim 1, wherein the control circuit is configured to distinguish messages for the outdoor lighting fixture from communications for routing to or from the one or more computing devices.

4. The outdoor lighting fixture of claim 3, wherein the control circuit is configured to parse the messages for the outdoor lighting fixture to determine whether the control circuit should cause the first ballast to change illumination states of the at least one lamp.

5. The outdoor lighting fixture of claim 1, wherein the control circuit and the radio frequency transceiver are wired to the power source for the outdoor lighting fixture.

6. The outdoor lighting fixture of claim 1, wherein the radio frequency transceiver is at least one of a WiFi and a WiMax compatible transceiver.

7. The outdoor lighting fixture of claim 1, wherein the control circuit includes a security module that checks a credential of at least one of the one or more computing devices attempting to connect to the radio frequency transceiver.

8. A system of outdoor lighting fixtures, comprising:
   a first outdoor lighting fixture comprising a first housing and a first radio frequency transceiver mounted to the first housing; and
   a second outdoor lighting fixture comprising a second housing and a second radio frequency transceiver mounted to the second housing;
   wherein the first outdoor lighting fixture further comprises wireless routing circuitry and a wired uplink connection to a data communications network, wherein the wireless routing circuitry and wired uplink connection are configured to wirelessly connect one or more computing devices proximate to the first outdoor lighting fixture to the data communications network;
   wherein the second radio frequency transceiver is configured to extend the range of the first radio frequency transceiver by forwarding data communications to and from the first radio frequency transceiver.

9. The system of outdoor lighting fixtures of claim 8, wherein the second radio frequency transceiver and the second outdoor lighting fixture do not include wireless routing circuitry, wherein the one or more computing devices proximate to the first outdoor lighting fixture comprise a first set of one or more computing devices, and wherein the second radio frequency transceiver is configured to connect a second set of one or more computing device proximate to the second outdoor lighting fixture to the data communications network by transmitting data communications between the second set of one or more computing devices and the first radio frequency transceiver.

10. The system of outdoor lighting fixtures of claim 8, wherein the second radio frequency transceiver and the second outdoor lighting fixture further comprise second wireless routing circuitry and an interface for a second wired uplink connection, wherein the one or more computing devices proximate to the first outdoor lighting fixture comprise a first set of one or more computing devices, and wherein the second radio frequency transceiver is configured to connect a second set of one or more computing device proximate to the second outdoor lighting fixture to the data communications network using the second wireless routing circuitry and the second wired uplink connection.

11. The system of outdoor lighting fixtures of claim 10, wherein the second radio frequency transceiver and the second wireless routing circuitry are configured to be set in a mode of operation comprising one of:
   (a) a wireless extender mode of operation wherein the second radio frequency transceiver is configured to extend the range of the first radio frequency transceiver by forwarding data communications to and from the first radio frequency transceiver; and
   (b) a wireless routing mode of operation wherein the second wireless routing circuitry is active and the second radio frequency transceiver does not operate to extend the range of the first radio frequency transceiver.

12. The system of outdoor lighting fixtures of claim 11, wherein the second radio frequency transceiver is coupled to automatic sensing circuitry that determines whether the interface for a second wired uplink connection is active.

13. The system of outdoor lighting fixtures of claim 12, wherein the second radio frequency transceiver defaults to the wireless extender mode of operation when the automatic sensing circuitry indicates that the interface for the second wired uplink connection is not active.

14. The system of outdoor lighting fixtures of claim 13, wherein the second radio frequency transceiver switches to the wireless routing mode of operation when the automatic sensing circuitry indicates that the interface for the second wired uplink connection is active.

15. The system of outdoor lighting fixtures of claim 8, wherein the first radio frequency transceiver is housed within the first housing.

16. The system of outdoor lighting fixtures of claim 8, wherein the first radio frequency transceiver is housed within a mount for mounting the first housing to a street light pole.

17. The system of outdoor lighting fixtures of claim 8, wherein the first radio frequency transceiver is coupled to a control circuit for the lighting fixture.

18. The system of outdoor lighting fixtures of claim 17, wherein the control circuit for the lighting fixture is configured to receive and interpret commands or messages for changing the operation of the lighting fixture.

19. The system of outdoor lighting fixtures of claim 17, wherein the control circuit is configured to cause usage information to be transmitted from the first radio frequency transceiver.

20. A method for providing municipal wireless network connectivity, comprising:
  coupling a plurality of outdoor lighting fixtures to existing street light poles;
  powering the plurality of outdoor lighting fixtures using power wires from the existing street light poles; and
  establishing a wireless network of outdoor lighting fixtures by configuring radio frequency transceivers of the plurality of outdoor lighting fixtures to serve as wireless network access points, wherein the radio frequency transceivers of the outdoor lighting fixtures are configured to wirelessly connect one or more computing devices proximate to the outdoor lighting fixtures to a communications network.

* * * * *